United States Patent
Yokoyama

(10) Patent No.: US 7,877,531 B2
(45) Date of Patent: Jan. 25, 2011

(54) IMAGE PROCESSING APPARATUS AND IMAGE PROCESSING APPARATUS CONTROLLING METHOD

(75) Inventor: Tomonori Yokoyama, Kanangawa (JP)

(73) Assignee: Sony Corporation, Tokyo (JP)

( * ) Notice: Subject to any disclaimer, the term of this patent is extended or adjusted under 35 U.S.C. 154(b) by 310 days.

(21) Appl. No.: 12/232,735

(22) Filed: Sep. 23, 2008

(65) Prior Publication Data

US 2009/0125644 A1 May 14, 2009

(30) Foreign Application Priority Data

Nov. 14, 2007 (JP) ............................. 2007-295967

(51) Int. Cl.
*G06F 13/12* (2006.01)
(52) U.S. Cl. .................... 710/72; 710/8; 710/14; 710/62; 710/65; 710/66; 358/1.16
(58) Field of Classification Search ................ None
See application file for complete search history.

(56) References Cited

U.S. PATENT DOCUMENTS 7,509,442 B2 * 3/2009 Wada et al. .................... 710/20

2007/0008325 A1 * 1/2007 Rai et al. ..................... 345/501

FOREIGN PATENT DOCUMENTS

| JP | 58-122688 | 7/1983 |
| JP | 2002-259327 | 9/2002 |
| JP | 2005-086224 | 3/2005 |
| JP | 2005-244709 | 9/2005 |
| JP | 2006-313645 | 11/2006 |

OTHER PUBLICATIONS

Budgett et al., Parallel Pixel Processing Using Programmable Gate Array, Aug. 15, 1996, IEEE, pp. 1557-1559.*
Anonymous, Non-Integer Interpolation with Parallel Pixel Delete, Apr. 30, 1981, IP.com, pp. 1-3.*

* cited by examiner

*Primary Examiner*—Eron J Sorrell
(74) *Attorney, Agent, or Firm*—Rader, Fishman & Grauer PLLC

(57) ABSTRACT

Disclosed herein is an image processing apparatus including an input section, a bus, a memory interface, an output section, and a control section.

17 Claims, 12 Drawing Sheets

FIG. 2

|  | WORD LENGTH (IN BITS) | NO. OF PARALLELLY OUTPUT PIXELS |
|---|---|---|
|  | bit |  |
| ALL-PIXEL READ-OUT (STILL IMAGE RECORDING) | 8 | 4 |
| HIGH-DEFINITION MOVING IMAGE RECORDING | 8 | 4 |
| STANDARD-DEFINITION MOVING IMAGE RECORDING | 8 | 2 |
| MONITORING MODE | 8 | 1 |

IMAGE PROCESSING APPARATUS AND IMAGE PROCESSING APPARATUS CONTROLLING METHOD

CROSS REFERENCES TO RELATED APPLICATIONS

The present invention contains subject matter related to Japanese Patent Application JP 2007-295967 filed in the Japan Patent Office on Nov. 14, 2007, the entire contents of which being incorporated herein by reference.

BACKGROUND OF THE INVENTION

1. Field of the Invention

The present invention relates to an image processing apparatus for processing image data taken by an imaging device and a method for controlling such an image processing apparatus.

2. Description of the Related Art

Some solid-state imaging devices proposed in recent years are designed to output data constituting a plurality of pixels in serial form, in such a manner that the pixels were output individually and in parallel. Such imaging devices are disclosed illustratively by Japanese Patent Laid-Open Nos. 2005-86224 and 2005-244709. These solid-state imaging devices make it easy to change the number of parallelly output pixels. Illustratively, the number of pixels output in parallel by the device is readily changed in accordance with the frame rate or the pixel count in effect.

Image processing apparatuses for processing the image data output by the above-cited type of solid-state imaging device typically keep their power dissipation in check by reducing their clock frequencies or by lowering their source voltages. However, such arrangements are becoming insufficient in bringing down power consumption. The reason is that in the face of advances in fine pattern lithography for processing semiconductors, leak currents are on the increase and source voltages have little room for further reductions.

There are lower limits to the operating frequencies of some memory units such as DDR2-SDRAMs (double-data-rate2 synchronous dynamic random access memory). Even if there is a surplus bandwidth capacity for access to this type of memory unit, it is impossible to bring its operating frequency under a given lower frequency limit. This makes it difficult to keep the power dissipation of the memory units low enough.

Japanese Patent Laid-Open No. 2002-259327 discloses a bus control apparatus for changing the width of a bus from one setting to another in keeping with the data traffic being monitored on that bus. One disadvantage of the disclosed apparatus is that it needs a traffic monitoring device when configured. Another disadvantage is that delays in bus width changeover are bound to occur because the process of data traffic monitoring precedes the operation of bus width changeover in the apparatus. The latter disadvantage in particular makes it difficult for the cited bus control apparatus to keep up with rapid ups and downs in data traffic.

Japanese Patent Laid-Open Nos. 2006-313645 and Sho 58-122688 disclose techniques for changing the number of data lines on memory units by changing the connective relations between the data lines and memory arrays. These techniques are for changing the mapping of the memory arrays in use. That is, reductions in data width are matched by increases in the number of words. Moreover, the disclosed techniques are irrelevant to stopping the clock feed to part of the memory arrays or partially halting power supply to the memory arrays.

Furthermore, the proposed techniques above for changing memory array mapping are not shown applicable to inexpensive, common memory units such as SDRAMs (synchronous dynamic random access memory), DDR-SDRAMs (double-data-rate synchronous dynamic random access memory) and DDR2-SDRAMs. In other words, these techniques are not available on the cheap.

SUMMARY OF THE INVENTION

The present invention has been made in view of the above circumstances and provides an image processing apparatus and an image processing apparatus controlling method, the image processing apparatus utilizing general-purpose memory units to process pixel data coming from an imaging device while minimizing power dissipation, the processed pixel data being output to the outside.

In carrying out the present invention and according to one embodiment thereof, there is provided an image processing apparatus including: an input section configured to have a total of m channels with input units for admitting pixel data output by an imaging section on a pixel-by-pixel basis and in parallel, m being a positive integer, and an arithmetic section arithmetically processing the pixel data input to the input units; a bus configured to be connected to the input section, the bus being further configured to transmit the pixel data processed arithmetically by the arithmetic section; a memory interface configured to be connected to the bus, the memory interface being further configured to write to a memory the pixel data arithmetically processed by the arithmetic section, the memory interface being further configured to control access to the memory in accordance with an access request from a processing unit connected to the bus; an output section configured to be connected to the memory interface through the bus, the output section being further configured to request the memory interface for access to the memory in order to read the pixel data therefrom for output to the outside; and a control section configured to change at least one of three parameters including a parallelly processed pixel count, a data bus width, and a memory interface data width in accordance with the number of the pixels represented by the pixel data which are acquired by the imaging section and input parallelly to the input section, the parallelly processed pixel count being the number of the pixels represented by the pixel data which are processed parallelly by the arithmetic section, the data bus width being one over which the bus transmits data, the memory interface data width being one over which the memory interface gains access to the memory.

According to another embodiment of the present invention, there is provided a method for controlling an image processing apparatus which includes: an input section configured to have a total of m channels with input units for admitting pixel data output by an imaging section on a pixel-by-pixel basis and in parallel, m being a positive integer, and an arithmetic section arithmetically processing the pixel data input to the input units; a bus configured to be connected to the input section, the bus being further configured to transmit the pixel data processed arithmetically by the arithmetic section; a memory interface configured to be connected to the bus, the memory interface being further configured to write to a memory the pixel data arithmetically processed by the arithmetic section, the memory interface being further configured to control access to the memory in accordance with an access request from a processing unit connected to the bus; and an output section configured to be connected to the memory interface through the bus, the output section being further configured to request the memory interface for access to the memory in order to read the pixel data therefrom for output to the outside; the method including the step of changing at least one of three parameters including a parallelly processed pixel count, a data bus width, and a memory interface data width in accordance with the number of the pixels represented by the pixel data which are acquired by the imaging section and input parallelly to the input section, the parallelly processed pixel count being the number of the pixels represented by the pixel data which are processed parallelly by the arithmetic section, the data bus width being one over which the bus transmits data, the memory interface data width being one over which the memory interface gains access to the memory.

According to a further embodiment of the present invention, there is provided an image processing apparatus including: an input section configured to admit pixel data acquired by an imaging section; a bus configured to be connected to the input section, the bus being further configured to transmit the pixel data input to the input section; a memory interface configured to be connected to the bus, the memory interface being further configured to write to a memory the pixel data which are transmitted over the bus and input to the input section, the memory interface being further configured to control access to the memory in accordance with an access request from a processing unit connected to the bus; an output section configured to be connected to the memory interface through the bus, the output section being further configured to include read units, arithmetic units and output units, the read units reading on a pixel-by-pixel basis and in parallel over a maximum of n channels the pixel data which represent a maximum of n pixels and which are written to the memory following an access request to the memory interface, n being a positive integer, the arithmetic units arithmetically processing on a pixel-by-pixel basis the pixel data read by the read units, the output units outputting to the outside the pixel data processed arithmetically by the arithmetic units; and a control section configured to change at least one of three parameters including a parallelly processed pixel count, a data bus width, and a memory interface data width in accordance with the number of the pixels represented by the pixel data output parallelly to the outside by the output units of the output section, the parallelly processed pixel count being the number of the pixels represented by the pixel data which are processed parallelly by the arithmetic units, the data bus width being one over which the bus transmits data, the memory interface data width being one over which the memory interface gains access to the memory.

According to an even further embodiment of the present invention, there is provided a method for controlling an image processing apparatus which includes: an input section configured to admit pixel data acquired by an imaging section; a bus configured to be connected to the input section, the bus being further configured to transmit the pixel data input to the input section; a memory interface configured to be connected to the bus, the memory interface being further configured to write to a memory the pixel data which are transmitted over the bus and input to the input section, the memory interface being further configured to control access to the memory in accordance with an access request from a processing unit connected to the bus; and an output section configured to be connected to the memory interface through the bus, the output section being further configured to include read units, arithmetic units, and output units, the read units reading on a pixel-by-pixel basis and in parallel over a maximum of n channels the pixel data which represent a maximum of n pixels and which are written to the memory following an access request to the memory interface, n being a positive integer, the arithmetic units arithmetically processing on a pixel-by-pixel basis the pixel data read by the read units, the output units outputting to the outside the pixel data processed arithmetically by the arithmetic units; the method including the step of changing at least one of three parameters including a parallelly processed pixel count, a data bus width, and a memory interface data width in accordance with the number of the pixels represented by the pixel data output parallelly to the outside by the output units of the output section, the parallelly processed pixel count being the number of the pixels represented by the pixel data which are processed parallelly by the arithmetic units, the data bus width being one over which the bus transmits data, the memory interface data width being one over which the memory interface gains access to the memory.

According to embodiments of the present invention typically embodied as outlined above, at least one of three parameters including a parallelly processed pixel count, a data bus width, and a memory interface data width is changed in accordance with the number of the pixels represented by the pixel data which are acquired by the imaging section and input parallelly to the input section, or in keeping with the number of the pixels represented by the pixel data output parallelly to the outside by the output units of the output section, the parallelly processed pixel count being the number of the pixels represented by the pixel data which are processed parallelly by the arithmetic section, the data bus width being one over which the bus transmits data, the memory interface data width being one over which the memory interface gains access to the memory. These arrangements make it possible to stop supplying power to those parts of semiconductor circuitry which are inactive and unnecessary for the moment in the image processing apparatus of the invention. With the inventive arrangements, it is also possible easily to stop feeding power to the memory of the image processing apparatus when unnecessary. The inventive image processing apparatus thus reduces power dissipation in carrying out image processing on the pixel data output by the imaging section and in outputting the processed data to the outside through the use of general-purpose memory units.

BRIEF DESCRIPTION OF THE INVENTION

FIG. 2 is a tabular view explanatory of imaging modes;

DETAILED DESCRIPTION OF THE PREFERRED EMBODIMENTS

The image processing apparatus according to embodiments of the present invention is basically an apparatus that performs image processing on the pixel data acquired by an imaging device through the use of memory units. The ensuing description will focus illustratively on a digital camera 1 that images objects using a solid-state imaging device such as one shown in FIG. 1.

Figure 1:
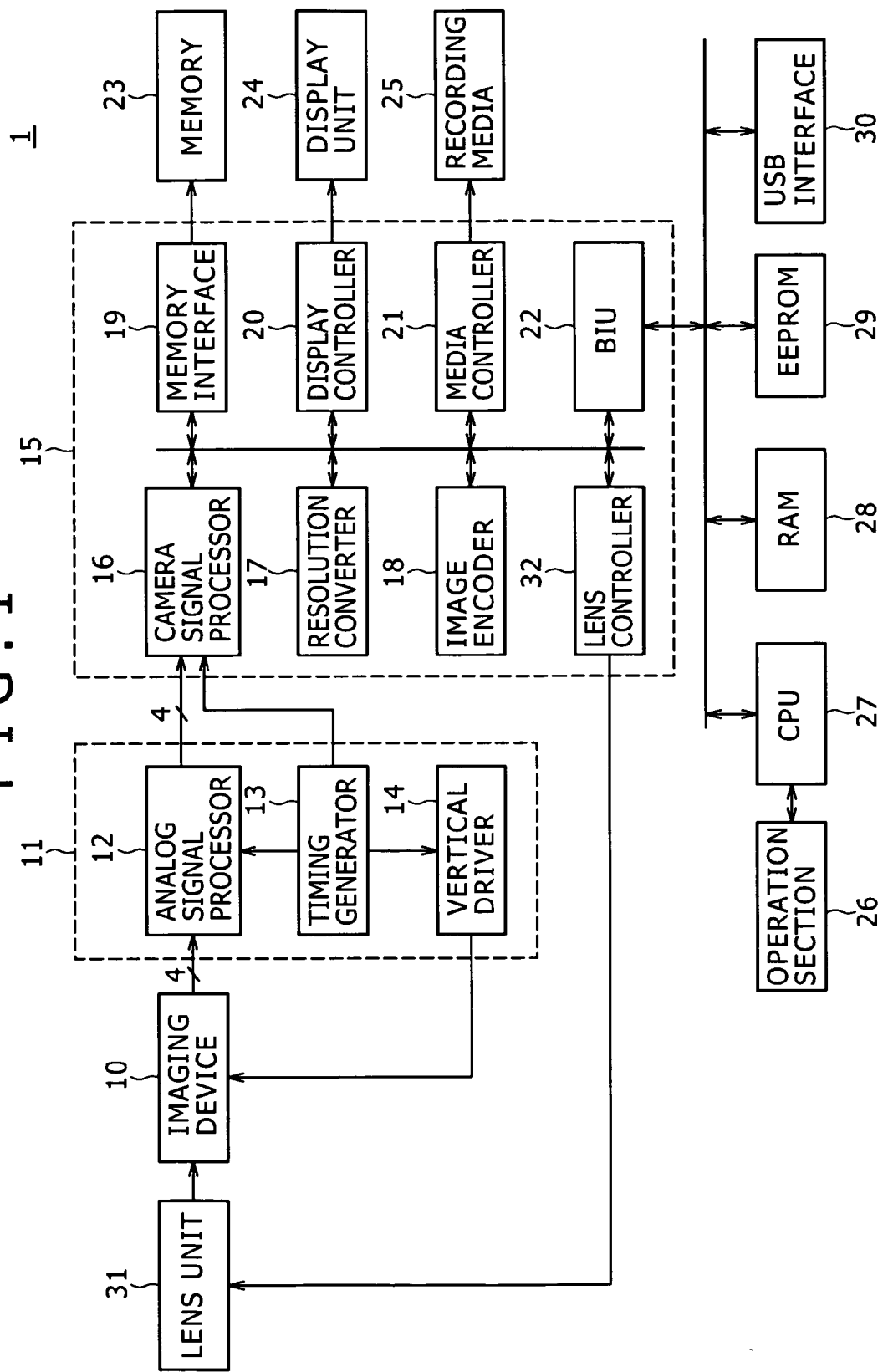
FIG. 1 is a block diagram showing an overall structure of a digital camera.

As indicated in FIG. 1, the digital camera 1 includes a lens unit 31, an imaging device 10, a preprocessor 11, an image processing device 15, a memory 23, a display unit 24, recording media 25, an operation section 26, a CPU (central processing unit) 27, a RAM (random access memory) 28, an EEPROM (electrically erasable and programmable read only memory) 29, and a USB (universal serial bus) interface 30.

The lens unit 31 includes a focusing lens, a zoom lens, an aperture mechanism, and drivers that drive these components in accordance with drive control signals fed by a lens controller 32, to be discussed later. The lens unit 31 receives an object image and has it formed on a light-receiving surface of the imaging device 10.

The imaging device 10 is typically a CDD (charge coupled device) or a CMOS (complementary metal-oxide semiconductor). The device is designed to acquire image information in the form of electrical signals.

More specifically, the imaging device 10 has pixel units arrayed two-dimensionally on its light-receiving surface, each pixel unit photoelectrically converting the light it has received into an electrical signal for output. In synchronism with a synchronizing signal from a vertical driver 14 (to be discussed later), the imaging device 10 reads the electrical signals from the pixel units and parallelly outputs the read signals representing a maximum of four pixels at a time to the preprocessor 11. The number of pixels parallelly read by the imaging device 10 is not limited to the maximum of four; the pixel count may be varied depending on desired performance.

The preprocessor 11 is made up of an analog signal processor 12, a timing generator 13, and the vertical driver 14.

The analog signal processor 12 performs CDS (correlated double sampling) on the electrical signals output on a pixel-by-pixel basis and in parallel by the imaging device 10, in such a manner as to maintain a good S/N ratio. The analog signal processor 12 further carries out AGC (automatic gain control) on the signals before submitting them to analog-to-digital (A/D) conversion to generate image data in digital signal form. The analog signal processor 12 thus creates the image data as serial pixel data for parallel output on a pixel-by-pixel basis.

In order to control the analog signal processor 12 in operation, the timing generator 13 generates a signal in synchronism with each of the data bits output by the analog signal processor 12 and supplies the generated signals to the analog signal processor 12 and vertical driver 14. The timing generator 13 also supplies the image processing device 15 with a serial input clock signal composed of the clock signal synchronized with each of the data bits, the image processing device 15 being fed with the pixel data from the analog signal processor 12.

The vertical driver 14 counts the clock supplied by the timing generator 13 to ensure vertical image synchronization, and supplies a synchronizing signal to the imaging device 10. The synchronizing signal controls the drive timing of the imaging device 10.

The imaging device 10 and preprocessor 11 mentioned above may be formed on a single semiconductor substrate or placed separately on different semiconductor substrates. Each of the pixel data output by the preprocessor 11 is in serial form and sent to the image processing device 15 through a serial interface. The serial interface handles a plurality of channels that allow the preprocessor 11 to feed the image processing device 15 with a plurality of parallelly arrayed pixel data constituting the image data.

The image processing device 15 is a typical image processing apparatus according to an embodiment of the present invention. The image processing device 15 includes a camera signal processor 16, a resolution converter 17, an image encoder 18, a memory interface 19, a display controller 20, a media controller 21, a BIU (bus interface unit) 22, and a lens controller 32. These components combine to put the image data from the preprocessor 11 into the memory 23 for temporary storage preparatory to predetermined image processing.

The camera signal processor 16 is mounted on the semiconductor substrate as an image input section 171, to be discussed later. In operation, the camera signal processor 16 admits the pixel data output by the imaging device 10 on a pixel-by-pixel basis and in parallel, and performs such processes as gamma correction and white balance control on the input pixel data. The camera signal processor 16 stores the image data into the memory 23 through the memory interface 19.

The resolution converter 17 is mounted on the semiconductor substrate as an image processing section 169, to be described later. In operation, the resolution converter 17 reads image data from the memory 23 through the memory interface 19 and converts the resolution of the retrieved image data.

The image encoder 18 is mounted on the semiconductor substrate as the image processing section 169, to be explained later. In operation, the image encoder 18 reads image data from the memory 23 through the memory interface 19 and encodes the retrieved image data in a manner reducing data redundancy so as to compress the data.

The memory interface 19 controls the above-mentioned processors when they gain access to the memory 23.

The display controller 20 is mounted on the semiconductor substrate as an image output section 170, to be discussed later. In operation, the display controller 20 reads image data from the memory 23 through the memory interface 19, converts the retrieved image data into a display format of the display unit 24, and feeds the converted image data to the display unit 24.

The media controller 21 is mounted on the semiconductor substrate as the image output section 170, to be described later. In operation, the media controller 21 reads image data from the memory 23 through the memory interface 19, converts the retrieved image data into a recording format of the recording media 25, and feeds the converted data to the media 25.

The BIU 22 is connected to the CPU 27 and other components via a system bus. Given control signals from the CPU 27, to be explained later, the BIU 22 controls in operation the component processors of the image processing device 15.

The lens controller 32 outputs drive control signals to the lens unit 31 in accordance with control commands coming from the BIU 22, thereby controlling the lens unit 31 in operation.

The memory 23, accessed by the component processors of the image processing device 15, is typically a general-purpose random access memory. Under access control of the memory interface 19, the memory 23 stores the image data fed from the image processing device 15 and reads the stored image data for output to the image processing device 15. The memory 23 is constituted by a plurality of memory units.

The display unit 24 is typically composed of a liquid crystal display or an organic electroluminescence display. In operation, the display unit 24 displays the image data supplied by the display controller 20.

The recording media 25 typically include nonvolatile storage media such as a flash memory, a hard disk and a magneto-optical disk. In operation, the recording media 25 record the image data supplied by the media controller 21.

An operation section 26 is a user interface that allows the user to operate the digital camera 1. The input operations performed by the user on the operation section 26 are signaled to the CPU 27.

Given the operation input from the operation section 26, the CPU 27 controls the component processors of the digital camera 1. In response to the operations carried out on the operation section 26, the CPU 27 reads control programs illustratively from the EEPROM 29 into the RAM 28 and supplies the control signals reflecting the control programs to the BIU 22 in the image processing device 15 through the system bus, whereby the digital camera 1 as a whole is controlled.

The USB (universal serial bus) interface 30 is a storage class-compliant device. As such, the USB interface 30 is used to acquire image data from an information processing apparatus such as a personal computer or to handle image files in the digital camera 1 using Explorer or like programs.

On the digital camera 1 of the above-described structure, the user may set a monitoring mode in which to monitor object images using the operation section 26. In such a case, the component processors operate as follows: the imaging device 10 and preprocessor 11 are set to take images with a pixel count smaller than that for recordable images. Images are then taken at intervals of a predetermined number of frames and the image data thus acquired is fed to the image processing device 15. At this point, the preprocessor 11 supplies the image data to the image processing device 15 using only part of the serial interface. In turn, the image processing device 15 writes the data coming from the camera signal processor 16 to the memory 23 through the memory interface 19. The image processing device 15 then reads the image data from the memory 23, causes the resolution converter 17 to change an image size, and outputs the data to the display unit 24 through the display controller 20.

On the digital camera 1, the user may set a still image recording mode in which to record still images using the operation section 26. In that case, the component processors operate as follows: the imaging device 10 and preprocessor 11 are set to acquire recordable images of a predetermined size. Recordable images are then taken and the image data is sent to the image processing device 15. At this point, the preprocessor 11 supplies the image data to the image processing device 15 using the entire serial interface.

The image processing device 15 writes the image data processed by the camera signal processor 16 to the memory 23 through the memory interface 19. Thereafter, the image processing device 15 reads the image data from the memory 23, causes the resolution converter 17 to change the image size, and outputs the data to the display unit 24 through the display controller 20.

The image processing device 15 reads image data from the memory 23, causes the resolution converter 17 to change the image size, causes the image encoder 18 to compress the image data into stream data typically in JPEG/MPEG format, and writes the compressed data to the recording media 25 through the media controller 21.

The digital camera 1 allows the user to select any one of four imaging modes including the monitoring mode in which to monitor object images and the still image recording mode in which to record still images as describe above. The other two modes are a high-definition (HD) moving image recording mode in which to record moving images with a high-definition image size, and a standard-definition (SD) moving image recording mode in which to record moving images with a standard-definition image size. When one of the imaging modes is selected, the imaging device 10 performs its imaging process accordingly by changing the number of the pixels to be output as electrical signals on a pixel-by-pixel basis and in parallel.

In keeping with the above-described imaging process, the analog signal processor 12 supplies the image processing device 15 with as many pixel data as the number of the electrical signals to be output in parallel by the imaging device 10.

Illustratively in the still image recording mode or HD moving image recording mode, the image processing device 5 is fed with pixel data of four pixels in parallel as indicated in FIG. 2. In the SD recording mode, the image processing device 15 is supplied with pixel data of two pixels in parallel. In the monitoring mode, the image processing device 15 is fed with pixel data of a single pixel.

Figure 3:
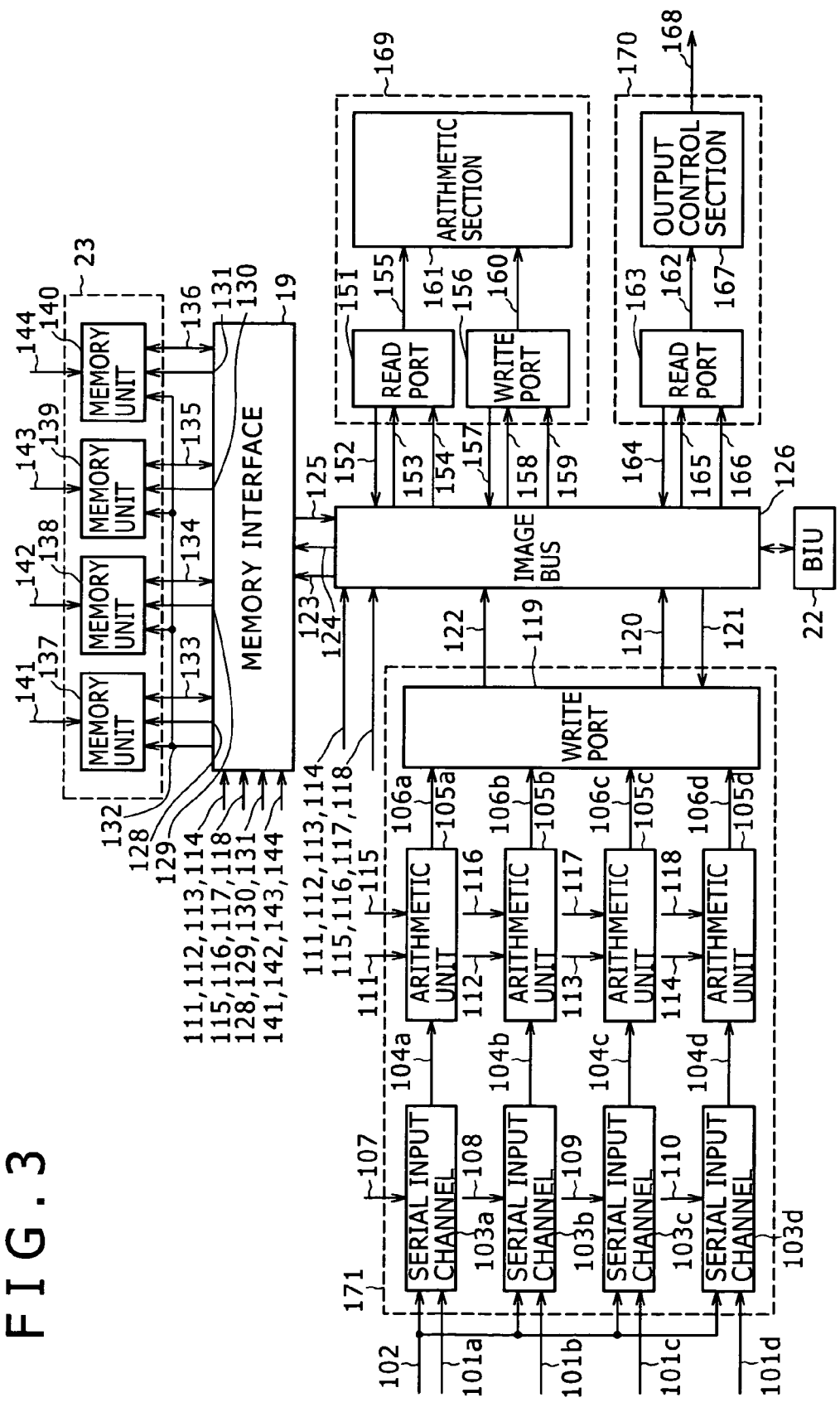
FIG. 3 is a schematic view showing a circuit structure of an image processing device practiced as a first embodiment of the present invention.

The image processing device 15 is mounted on a circuit board structured as shown in FIG. 3. This setup is designed to reduce power dissipation in the SD recording mode or monitoring mode in which throughput per unit time is relatively low.

FIG. 3 schematically shows the image processing device 15 practiced as the first embodiment of the present invention along with the memory 23, both mounted on a circuit board.

As shown in FIG. 3, the image processing device 15 mounted on the circuit board is structured to have the image input section 171, memory interface 19, image processing section 169, image output section 170, and BIU 22 interconnected via an image bus 126. These components are driven when fed with power and supplied with an operation clock signal from a power supply output section 149 and a clock output section 150, respectively, in a control section 146 (to be discussed later) mounted on the circuit board.

The memory 23 connected with the image processing device 15 on the circuit board is connected to the memory interface 19 by way of a total of "w" (a positive integer) data lines. In this setup, the memory 23 is furnished as a total of "w" memory units each having a data width equal to 1/w of the data width of the memory interface 19. More specifically, as shown in FIG. 3, the memory 23 is assumed to include a total of four memory units 137, 138, 139 and 140 connected with the memory interface 19 through four data lines.

Illustratively, the memory devices 137, 138, 139 and 140 may each be an SDRAM, DDR-SDRAM, DDR2-SDRAM, or Mobile DDR-SDRAM. The memory devices 137, 138, 139 and 140 are fed with memory power supplies 141, 142, 143 and 144, respectively, by the control section 146. The memory power supplies 141, 142, 143 and 144 are different from one another and are turned on and off individually. These arrangements make it possible to supply power only to the memory units connected selectively with the memory interface 19 for partial data input or output.

The image input section 171 represents the function of the above-mentioned camera signal processor 16 being implemented on the semiconductor substrate. The image input section 171 serves as an input section that handles a total of "m" channels (m is a positive integer) for admitting the serial pixel data output by the serial interface of the preprocessor 11 on a pixel-by-pixel basis and in parallel. More specifically, the image input section 171 includes four serial input channels 103a, 103b, 103c and 103d; arithmetic units 105a, 105b, 105c and 105d for arithmetically processing the pixel data input to the serial input channels 103a, 103b, 103c and 103d, respectively; and a write port 119 for outputting the arithmetically processed pixel data onto the image bus 126.

The serial input channels 103a, 103b, 103c and 103d are fed respectively with pixel data 101a, 101b, 101c and 101d, each in an eight-bit serial format from the analog signal processor 12. The timing generator 13 feeds a serial input clock signal 102 to the serial input channels 103a, 103b, 103c and 103d.

The serial input channels 103a, 103b, 103c and 103d convert the serial pixel data 101a, 101b, 101c and 101d into pixel data 104a, 104b, 104c and 104d, each in a parallel format. Following the conversion, the pixel data 104a, 104b, 104c and 104d are fed to the arithmetic units 105a, 105b, 105c and 105d, respectively.

The serial input channels 103a, 103b, 103c and 103d operate when powered by power supplies 107, 108, 109 and 110 respectively. Each of the power supplies is turned on and off by the control section 146, to be discussed later.

The number of the pixels output parallelly by the analog signal processor 12 varies depending on the imaging mode in effect. For example, the pixel data 101a, 101b, 101c and 101d are input to the image input section 171 in the still image recording mode or HD moving image recording mode; the pixel data 101a and 101b are input to the image input section 171 in the SD moving image recording mode; and the pixel data 101a is input to the image input section 171 when the monitoring mode is in effect.

The arithmetic units 105a, 105b, 105c and 105d perform gamma correction and white balance control on the parallel pixel data 104a, 104b, 104c and 104d supplied by the serial input channels 103a, 103b, 103c and 103d, respectively. Following the arithmetic processing, pixel data 106a, 106b, 106c and 106d are forwarded from the arithmetic units to the write port 119.

The arithmetic units 105a, 105b, 105c and 105d operate when powered by the power supplies 107, 108, 109 and 110 and fed with operation clock signals 115, 116, 117 and 118, respectively. Each of the power supplies is turned on and off by the control section 146, to be discussed later.

The number of arithmetic units is not limited to four, i.e., the same number as that of serial input channels. Alternatively, the number of arithmetic units may be made smaller than that of serial input channels, the latter carrying out their processing on a time-sharing basis.

The write port 119 sends the arithmetically processed pixel data 106a through 106d to the image bus 126. In operation, when supplied with a predetermined number of pixel data from the arithmetic units 105a, 105b, 105c and 105d, the write port 119 sends a write request signal 120 to the image bus 126 and waits for a write enable signal 121 to be returned from the bus 126. Upon receipt of the write enable signal 121 from the image bus 126, the write port 119 outputs the predetermined number of pixel data coming from the arithmetic units 105a, 105b, 105c and 105d onto the image bus 126 as write data 122. The write port 119 changes the data width of the write data 122 in accordance with the number of pixels in the pixel data supplied parallelly from the arithmetic units 105a through 105d, or in keeping with the value obtained by multiplying the pixel count by the number of bits in the pixel data. The data width is changed so as to ensure a minimum necessary data width over which to transmit the write data 122 to the image bus 126.

The image bus 126 arbitrates write and read requests from a plurality of bus masters. The image bus 126 then outputs a write or read enable signal to the selected bus master and outputs a command 123 to the memory interface 19.

More specifically, the image bus 126 is connected to the write port 119 of the above-described image input section 171 and to a write port 156 of the image processing section 169, to be discussed later, through a plurality of data lines each transmitting serial data, both ports serving as bus masters to which a write request is input. The image bus 126 is further connected to a read port 151 of the image processing section 169 and to a read port 163 owned by the image output section 170 through a plurality of data lines each transmitting serial data, both ports serving as bus masters to which a read request is input.

The command 123 output by the image bus 126 to the memory interface 19 includes an access type designating either write or read access, an address indicating the starting location of the memory area to be accessed, and the size of the memory area to be accessed.

In the case of write access, the image bus 126 first outputs the command 123, then selects the write data from the master for which a write operation has been enabled, and outputs write data 124 to the memory interface 19.

Figure 4:
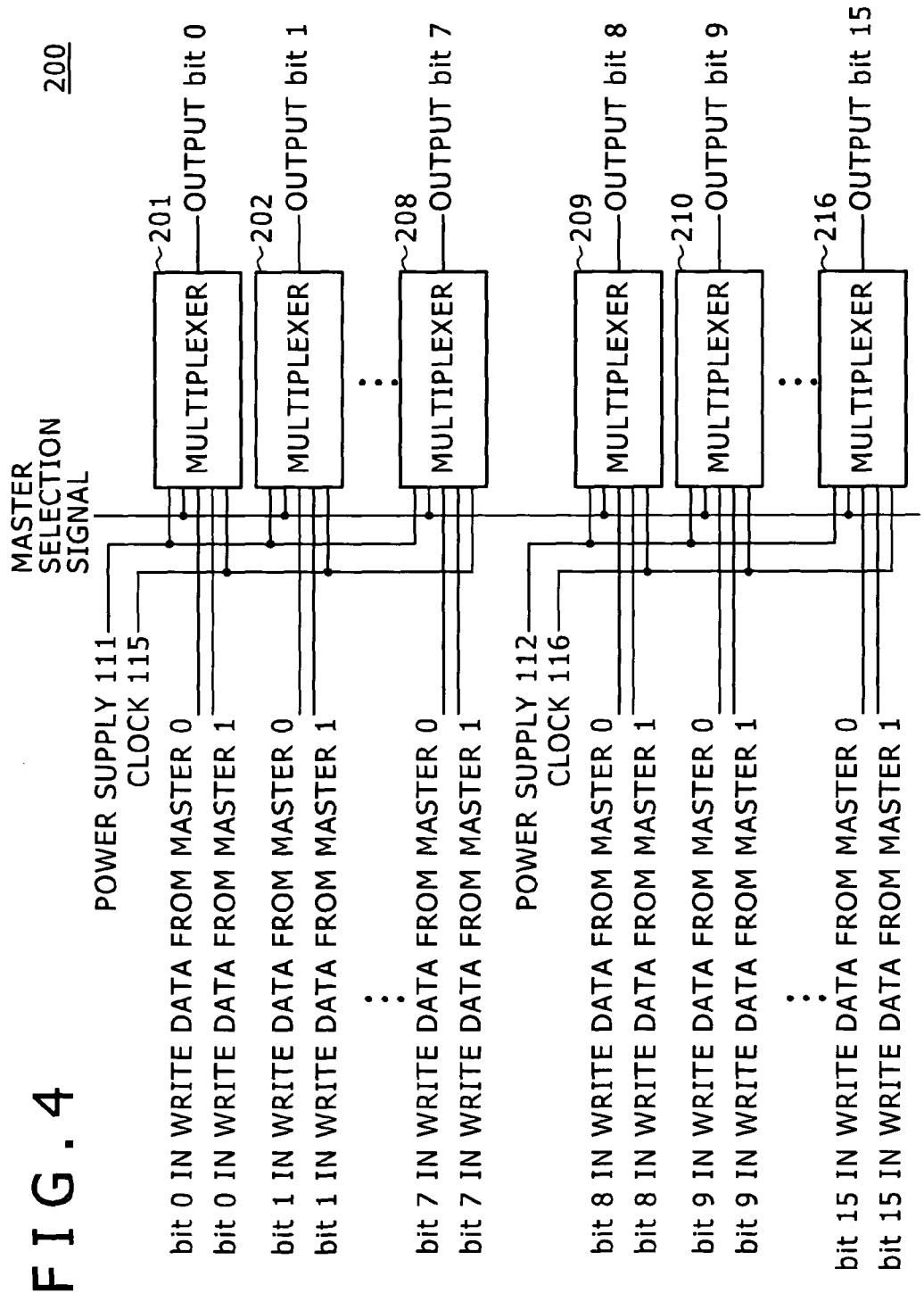
FIG. 4 is a schematic view explanatory of a structure of a write data selection circuit.

Illustratively, the image bus 126 is furnished with a write data selection circuit 200 such as one shown in FIG. 4. The write data selection circuit 200 is used to carry out the above-mentioned write operation.

FIG. 4 schematically shows part of the write data selection circuit 200 for selecting one of the write data output by two write masters. The image bus 126 is provided with a total of 32 multiplexers each selecting one of the write data lines output by two write maters.

For purpose of explanation, FIG. 4 shows half of all 32 multiplexers, i.e., 16 multiplexers 201 through 216. Based on a master selection signal reflecting the write request signal, each of the multiplexers 201 through 216 selects the data line connected to one of two write masters 0 and 1 which in turn are connected to the data lines of the image bus 126. The selected data line is used to send pixel data to the memory interface 19.

These 16 multiplexers 201 through 216 may be divided illustratively into two groups of eight. The two groups of multiplexers operate when powered by power supplies 111 and 112 and supplied with operation clock signals 115 and 116, respectively, from the control section 146.

Figure 5:
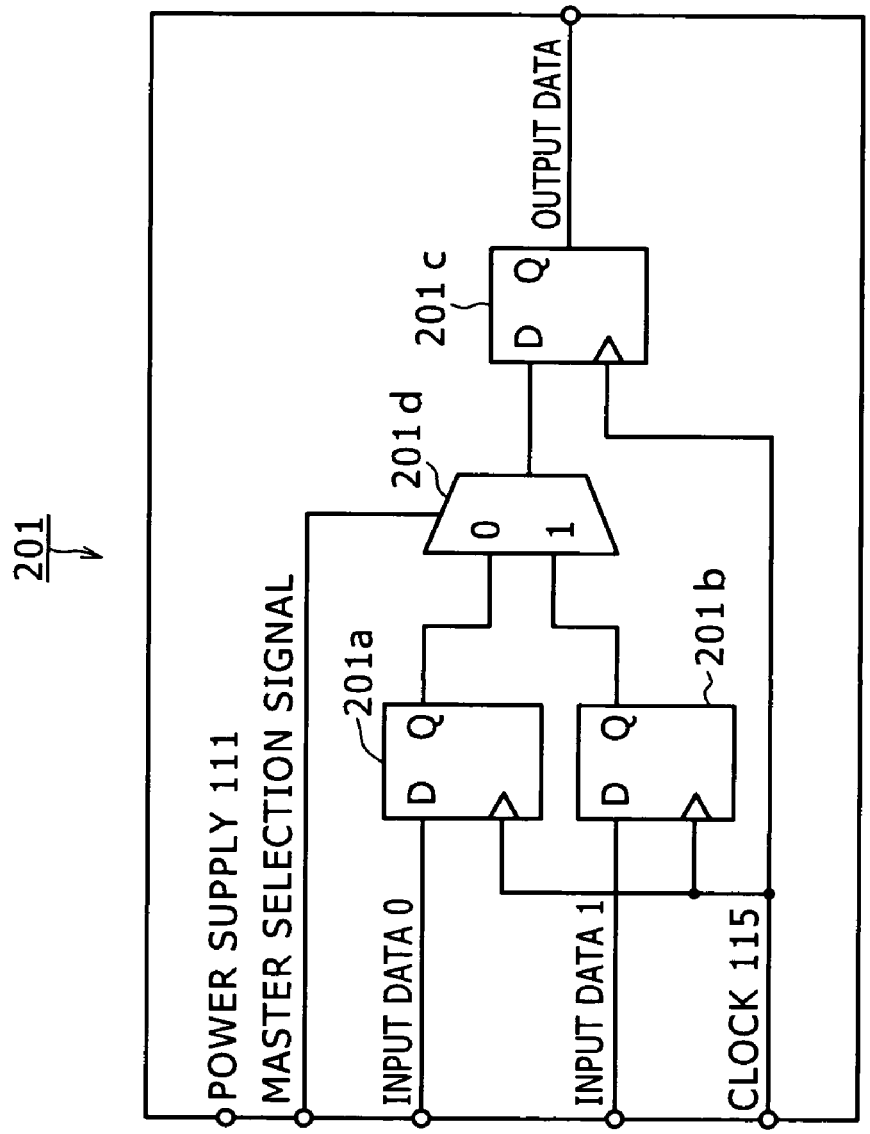
FIG. 5 is a schematic view showing a structure of a multiplexer.

FIG. 5 is a schematic view showing the structure of the multiplexer 201 representative of all multiplexers, the view being explanatory of how each multiplexer operates. As shown in FIG. 5, the multiplexer 201 includes three flip-flops 201a, 201b and 201c and a selector 201d.

In the multiplexer 201, an input data item 0 from a master 0 is input to the flip-flop 201a and an input data item 1 from a master 1 is input to the flip-flop 201b. These data items are held temporarily by the flip-flops. Upon input of an operation clock signal 115 to the flip-flops 201a and 201b, these flip-flops output the input data items 0 and 1, respectively, to the selector 201d. When a master selection signal is input to the selector 201d, the selector 201d selects one of the input data items 0 and 1 and outputs the selected data item to the flip-flop 201c. Upon input of the operation clock signal 115 to the flip-flop 201c, the flip-flop sends the data item received from the selector 201d to the memory interface 19 as output data.

In the write data selection circuit 200 of the above-described structure, the power supplies 111, 112, 113 and 114 as well as the operation clock signals 115, 116, 117 and 118 supplied from the control section 146 may be turned on and off individually to change the data width over which to send write data to the memory interface 19 in increments of eight bits for a maximum of 32 bits corresponding to pixel data of four pixels. That is, the operation clock signals or power supplies to the unused multiplexers can be stopped.

The write data selection circuit 200 is structured to have the write data width changed in increments of eight bits. Alternatively, the write data width may be changed in increments of a different number of bits as long as the bit count is an integer multiple of the pixel data width in effect.

In the case of read access, the image bus 126 first outputs the command 123, and then waits for the memory interface 19 to output read data 125. When supplied with the read data 125, the image bus 126 outputs the read data to the master for which a read operation has been enabled.

Figure 6:
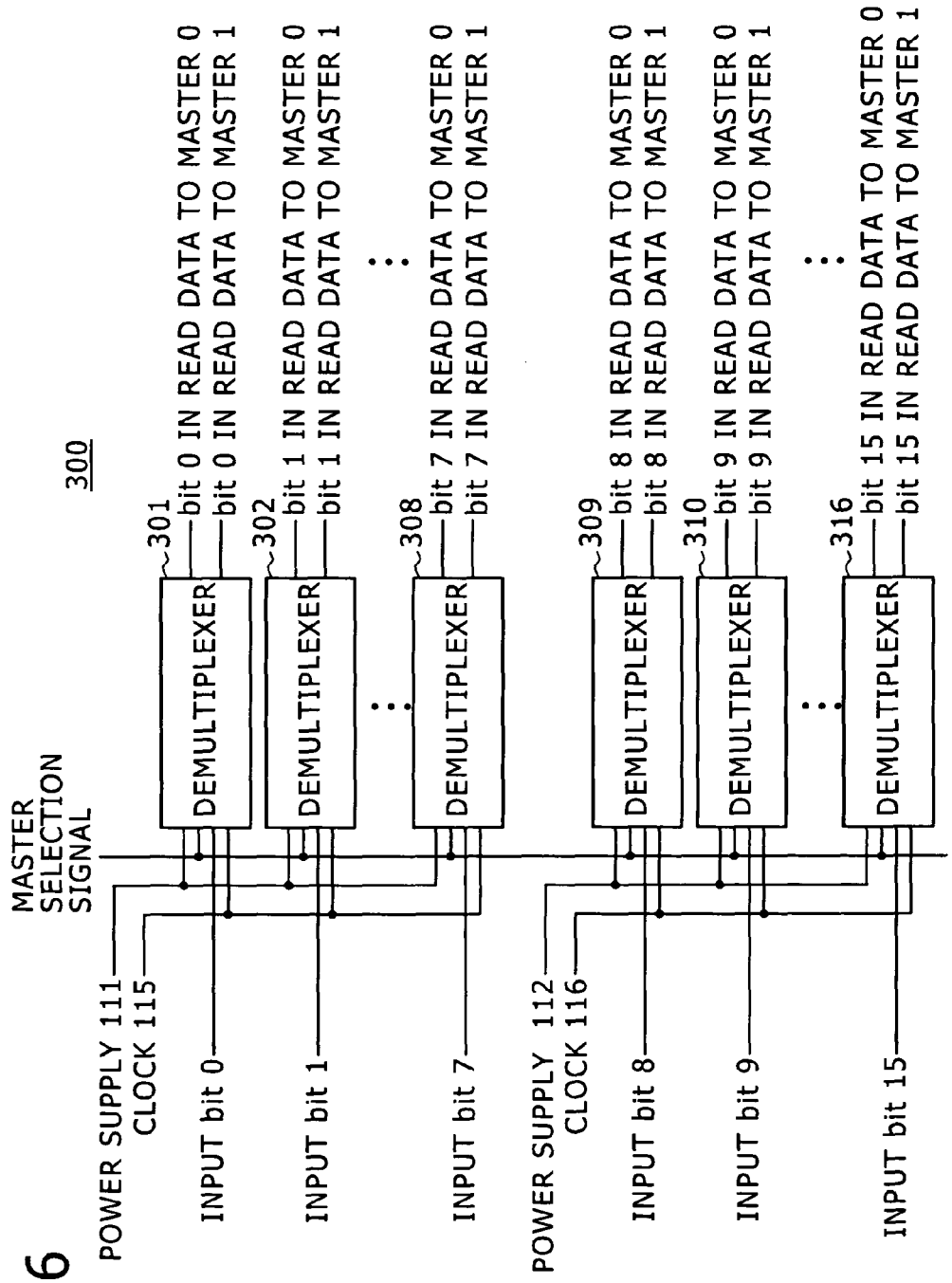
FIG. 6 is a schematic view explanatory of a structure of a read data selection circuit.

Illustratively, the image bus 126 is furnished with a read data selection circuit 300 such as one shown in FIG. 6. The read data selection circuit 300 is used to carry out the above-mentioned read operation.

FIG. 6 schematically shows part of the read data selection circuit 300 for outputting one read data input to one of the data lines of two read masters. The read data selection circuit 300 is provided with a total of 32 demultiplexers each outputting a one-bit input signal selectively to one of two outputs. For purpose of explanation, FIG. 6 shows half of all 32 demultiplexers, i.e., 16 demultiplexers 301 through 316. Based on a master selection signal reflecting the read request signal, each of the demultiplexers 301 through 316 selects the data line connected to one of two read masters 0 and 1 which in turn are connected to the data lines of the image bus 126. The pixel data read from the memory 23 via the memory interface 19 is sent to the selected data line. These 16 demultiplexers 301 through 316 may be divided illustratively into two groups of eight. The two groups of demultiplexers operate when powered by the power supplies 111 and 112 and supplied with the operation clock signals 115 and 116, respectively, from the control section 146.

Figure 7:
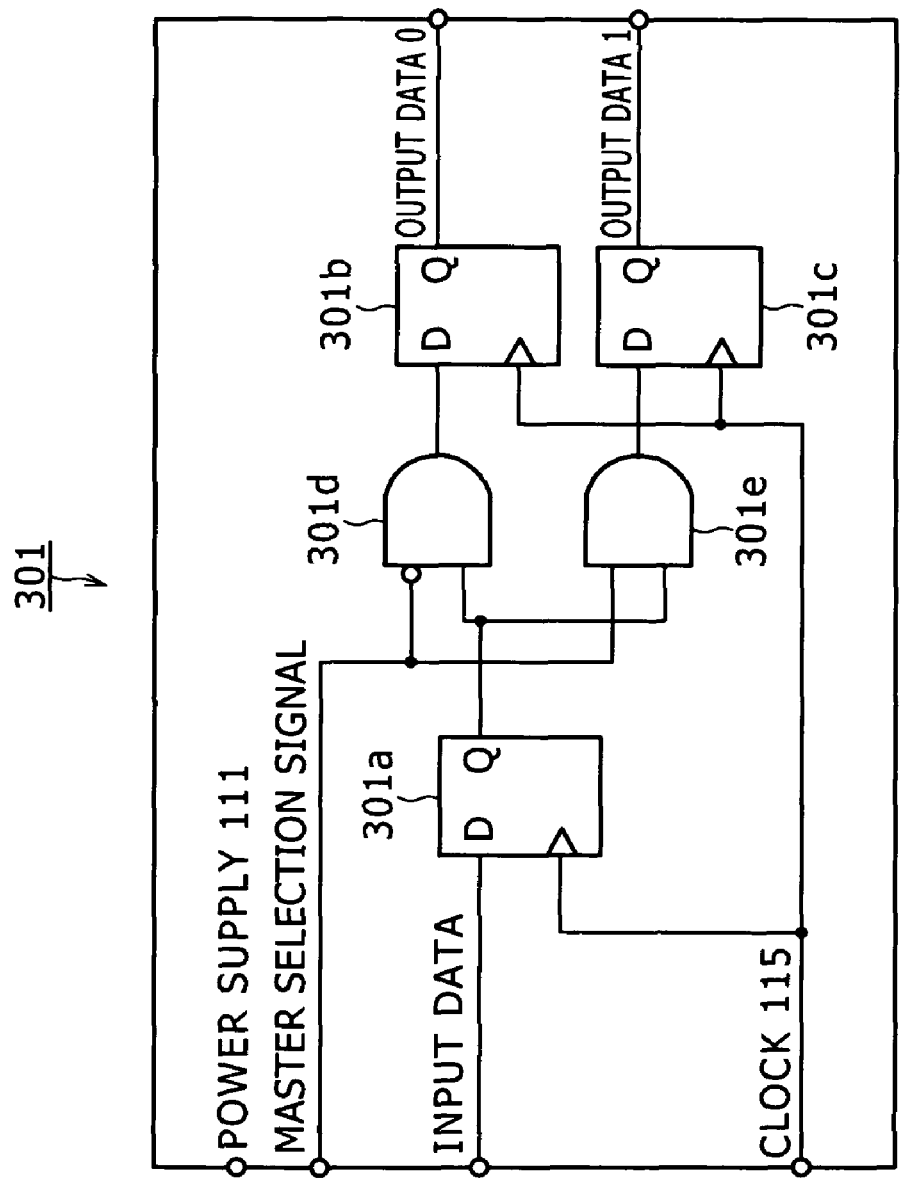
FIG. 7 is a schematic view showing a structure of a demultiplexer.

FIG. 7 is a schematic view showing the structure of the demultiplexer 301 representative of all demultiplexers, the view being explanatory of how each demultiplexer operates. As shown in FIG. 7, the demultiplexer 301 includes three flip-flops 301a, 301b and 301c and two AND circuits 301d and 301e.

In the demultiplexer 301, the input data coming from the memory interface 19 is input to the flip-flop 301a and held there temporarily. Upon input of an operation clock signal 115 to the flip-flop 301a, the flip-flop 301a outputs the input data to the AND circuits 301d and 301e. When the master selection signal with its 0/1 inverted is input to the AND circuit 301d and the noninverted master selection signal is input to the AND circuit 301e, one of the two AND circuits is selected according to the signals. The selected AND circuit outputs the input data. The input data output by the AND circuit 301d is held temporarily by the flip-flop 301b. In synchronism with the operation clock signal 115, the flip-flop 301b outputs the input data to a master 0 as an output data item 0. The input data output by the AND circuit 301e is held temporarily by the flip-flop 301c. In synchronism with the operation clock signal 115, the flip-flop 301c outputs the input data to a master 1 as an output data item 1.

In the read data selection circuit 300 of the above-described structure, the power supplies 111, 112, 113 and 114 as well as the operation clock signals 115, 116, 117 and 118 may be turned on and off individually to change the read data width in increments of eight bits for a maximum of 32 bits. That is, the operation clock signals or power supplies destined for the unused demultiplexers can be stopped.

The read data selection circuit 300 is structured to have the read data width changed in increments of eight bits. Alternatively, the read data width may be changed in increments of a different number of bits as long as the bit count is an integer multiple of the serial bit width per unit pixel data.

As described, the image bus 126 changes its write data width and read data width in predetermined increments by suitably driving the write data selection circuit 200 and read data selection circuit 300. If the maximum data width is not fully used, the power supplies or operation clock signals can be selectively discontinued by the control section 146 in order to reduce unnecessary power dissipation.

To write or read data to or from the memory 23 in response to the command 123 coming from the image bus 126, the memory interface 19 feeds a command control signal 132 to the memory units 137, 138, 139 and 140. In turn, the memory units 137, 138, 139 and 140 admit or output data 133, 134, 135 and 136, respectively.

More specifically, when fed with the command 123 from the image bus 126, the memory interface 19 outputs the command control signal 132 to the memory 23. If the command 123 specifies a write operation, then the memory interface 19 writes the data 133, 134, 135 and 136 to the memory units 137, 138, 139 and 140, respectively, as write data. If the command 123 designates a read operation, then the memory interface 19 reads the data 133, 134, 135 and 136 from the memory units 137, 138, 139 and 140, respectively, as read data.

Figure 8:
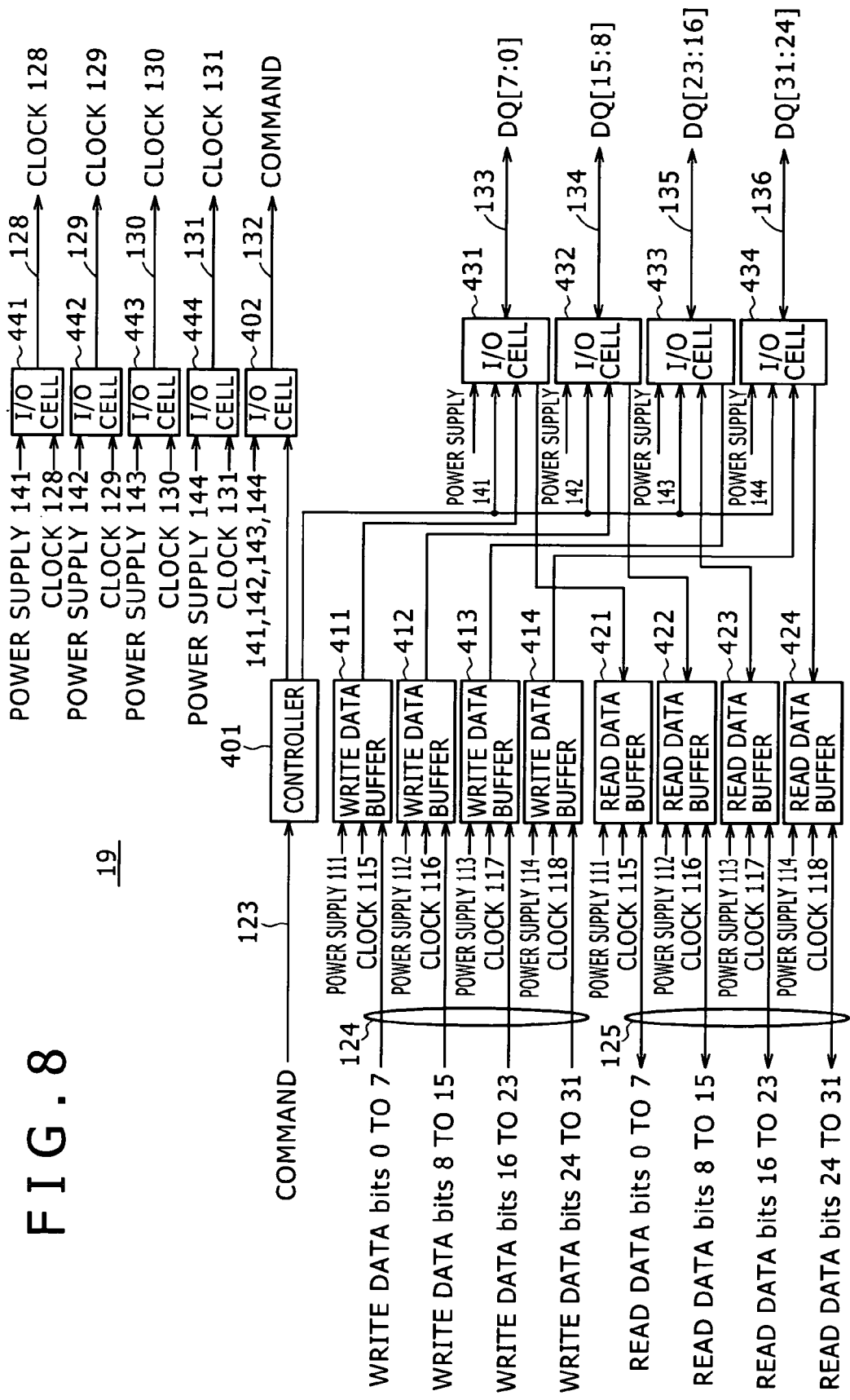
FIG. 8 is a schematic view showing an internal structure of a memory interface.

In order to access the memory 23 as described above, the memory interface 19 is structured as shown in FIG. 8. That is, the memory interface 19 includes a controller 401 and an I/O cell 402. The controller 401 generates the control signal 132 destined for the memory 23 in accordance with the command 123 coming from the image bus 126. The I/O cell 402 outputs the command control signal 132 generated by the controller 401 to the memory 23. The I/O cell 402 operates when fed with the memory power supplies 141, 142, 143 and 144.

The memory interface 19 includes write data buffers 411 through 414, read data buffers 421 through 424, and I/O cells 431 through 434. The write data buffers 411 through 414 divide and buffer in four groups the write data 124 (bits 0 to 31) having a data width of a maximum of 32 bits and coming from the image bus 126, each divided group being made up of eight bits of write data. The read data buffers 421 through 424 read and buffer the read data 125 (bits 0 to 31) having a data width of a maximum of 32 bits and coming from the memory units 137, 138, 139 and 140. The I/O cells 431 through 434 permit output and input of the data 133, 134, 135 and 136 (i.e., write data output and read data input) to and from the memory units 137 through 140, respectively.

The write data buffers 411 through 414 supply the buffered write data 124 to the I/O cells 431 through 434, respectively. The write data buffers 411 through 414 operate when powered by the power supplies 111 through 114 and fed with the operation clock signals 115 through 118, respectively. Each of the power supplies 111 through 114 is turned on and off by the control section 146, as will be discussed later.

The read data buffers 421 through 424 buffer the data 133 through 136 input to the I/O cells 431 through 434, respectively. The read data buffers 421 through 424 operate when powered by the power supplies 111 through 114 and fed with the operation clock signals 115 through 118, respectively. Each of the power supplies 111 through 114 is turned on and off by the control section 146, as will be described later.

The I/O cells 431 through 434 operate when powered by the power supplies 141 through 144 and supplied with the command control signal 132 from the controller 401. The power supplies 141 through 144 are turned on and off individually by the control section 146, as will be explained later.

The memory interface 19 further includes I/O cells 441 through 444 that forward operation clock signals 128, 129, 130 and 131 coming from the control section 146 to the memory units 137, 138, 139 and 140 respectively. The I/O cells 441 through 444 are turned on and off individually by the control section 146, to be discussed later, and operate when powered by the power supplies 141 through 144 giving power to the corresponding memory units.

In the memory interface 19 of the above-described structure, the write data 124, write data buffers 411 through 414, I/O cells 431 through 434 and 441 through 444, read data buffers 421 through 424, and read data 125 are divided into groups of eight bits. The memory interface 19 is structured so that the operation clock signals and power supplies are turned on and off individually.

In the memory interface 19, as described above, the data width for data input and output may be changed in increments of eight bits. Those inactive of the I/O cells 431 through 434 and 441 through 444, read data buffer 421 through 424, and write data buffers 411 through 414 are not fed with the corresponding operation clock signals or power supplies, whereby unnecessary power dissipation is reduced. In the memory interface 19, the data width for output and input of the write data 124 and read data 125 to and from the image bus 126 is the same as the data width for data output and input to and from the memory 23. Alternatively, the two data widths can be made different.

The image processing section 169 is a processing section that performs image processing on the image data retrieved from the memory 23. The image processing section 169 includes the read port 151, an arithmetic section 161, and the write port 156. The read port 151 reads image data from the memory 23 through the image bus 126. The arithmetic section 161 performs image processing on the pixel data 155 retrieved by the read port 151. The write port 156 writes the image data 160 having undergone the image processing by the arithmetic section 161, to the memory 23 by way of the image bus 126.

Specifically, the read port 151 outputs a read request signal 152 to the image bus 126. Given a read enable signal 153 from the image bus 126 in return, the read port 151 is fed subsequently with read data 153 and outputs the supplied data to the arithmetic section 161 as the read pixel data 155.

The arithmetic section 161 performs arithmetic processes which, illustratively including noise removal, correspond to the functions of the above-described resolution converter 17 and image encoder 18. The arithmetic section 161 supplies the processed image data 160 to the write port 156. In turn, the write port 156 outputs a write request signal 157 to the image bus 126 and, upon receipt of a write enable signal 158 therefrom, outputs write data 159 to the memory 23 via the image bus 126. In the image processing device 15, there may be a plurality of image processing sections 169 connected to the image bus 126.

The image output section 170 outputs the image data processed by the image processing section 169 and stored in the memory units 137 through 140 to the display unit 24 and recording media 25. The image output section 170 includes a read port 163 and an output control section 167. The read port 163 reads image data from the memory 23, and the output control section 167 converts pixel data 162 read by the read port 163 into a predetermined data format for output to the outside of the device.

The read port 163 outputs a read request signal 164 to the image bus 126. Upon receipt of a read enable signal 165 along with subsequent read data 166 from the image bus 126, the read port 163 outputs the supplied data to the output control section 167 as the read pixel data 162.

Given the read pixel data 162 from the read port 163, the output control section 167 converts the format and timing of the data to obtain image output data 168 to be output. As the image output data 168, the output control section 167 outputs the data formed either by compressed image data or by a synchronizing signal and digital data expressed in luminance and color difference formats defined by ITU-R BT.601. The image output section 170 outputs as the image output data 168 the image data in a format suitable for storage into a storage device such as a NAND flash memory. There may be a plurality of image output sections 170 connected to the image bus 126.

Figure 9:
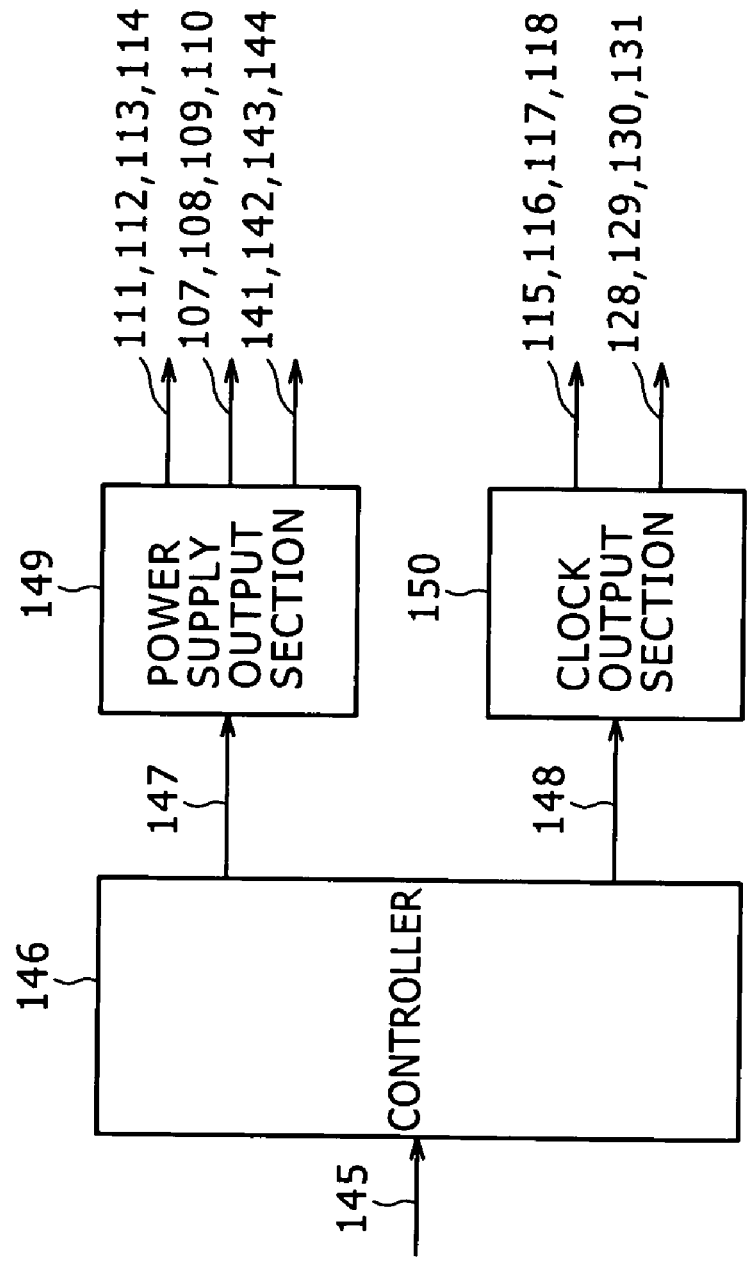
FIG. 9 is a schematic view showing an internal structure of a BIU (bus interface unit)

The BIU (bus interface unit) 22 is designed to supply power and operation clock signals to the component processors of the image processing device 15 in accordance with control signals coming from the CPU 27. As shown in FIG. 9, the BIU 22 includes the control section 146, power supply output section 149, and clock output section 150. The power supply output section 149 supplies power to a plurality of power supply systems in the image processing device 15. The clock output section 150 feeds operation clock signals to a plurality of clock systems in the device 15.

The control section 146 supplies a power supply control signal 147 to the power supply output section 149 and a clock control signal 148 to the clock output section 150. The signals are supplied based on the number of serial input channels 145 being used in accordance with the imaging mode selected by the CPU 27.

Figure 10:
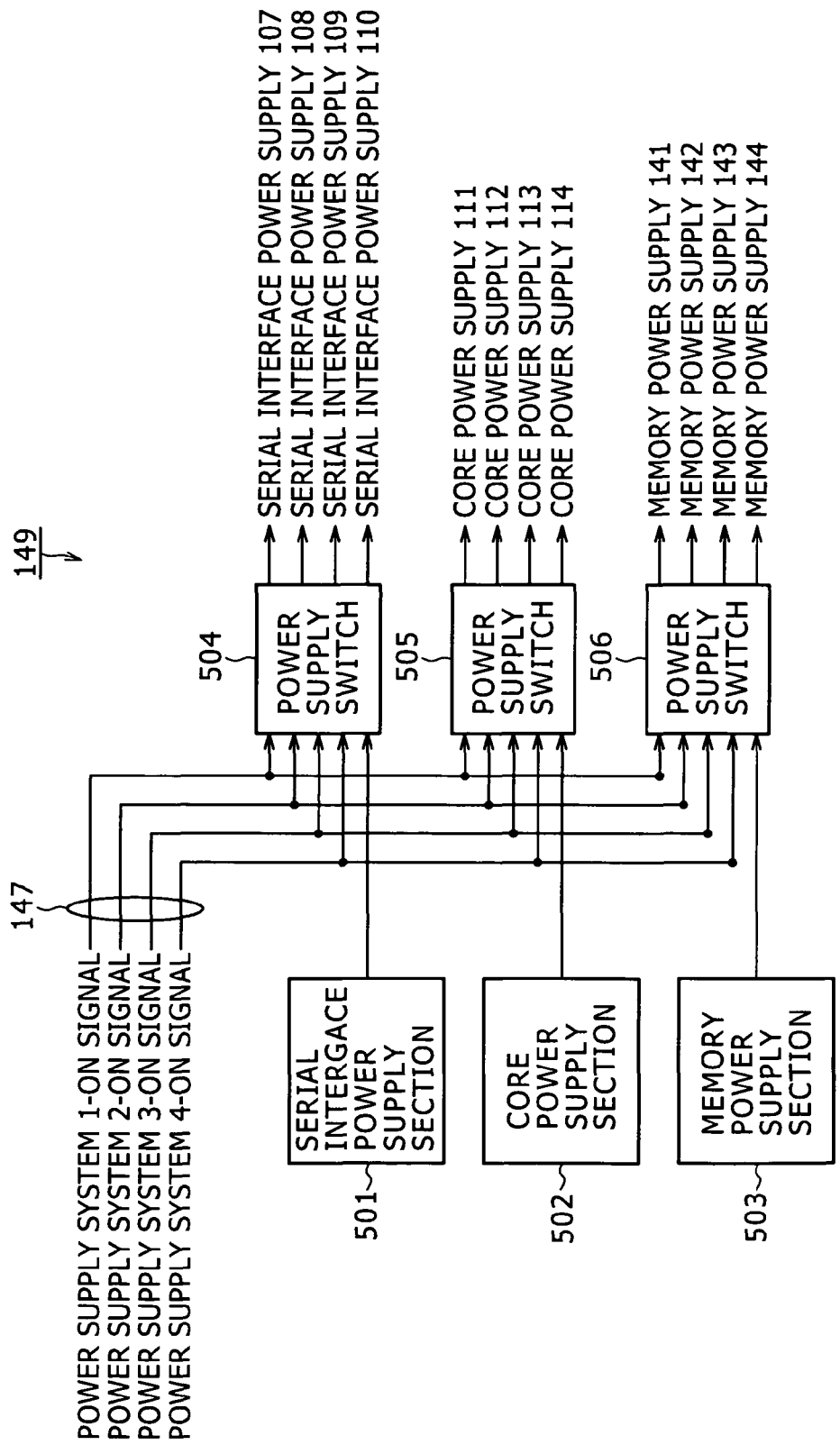
FIG. 10 is a schematic view showing an internal structure of a power supply output section.

The power supply output section 149, as shown in FIG. 10, includes a serial interface power supply section 501, a core power supply section 502, a memory power supply section 503, and three power supply switches 504, 505 and 506.

The serial interface power supply section 501 feeds the power supplies 107 through 110 to the components of the image input section 171 by way of the power supply switch 504.

The core power supply section 502 feeds the power supplies 111 through 114 to the image bus 126 and to the components of the memory interface 19 via the power supply switch 505.

The memory power supply section 503 feeds the power supplies 141 through 144 to the memory units 137 through 140 through the power supply switch 505.

The power supply switch 504 lets the power supplies 107 through 110 be fed to the image input section 171 in accordance with a power supply system 1-ON signal through a power supply system 4-ON signal coming from the control section 146.

The power supply switch 505 allows the power supplies 111 through 114 to be fed to the image bus 126 and memory interface 19 in accordance with the power supply system 1-ON signal through the power supply system 4-ON signal coming from the control section 146.

The power supply switch 506 permits the power supplies 141 through 144 to be fed to the memory units 137 through 140 in accordance with the power supply system 1-ON signal through the power supply system 4-ON signal coming from the control section 146.

Figure 11:
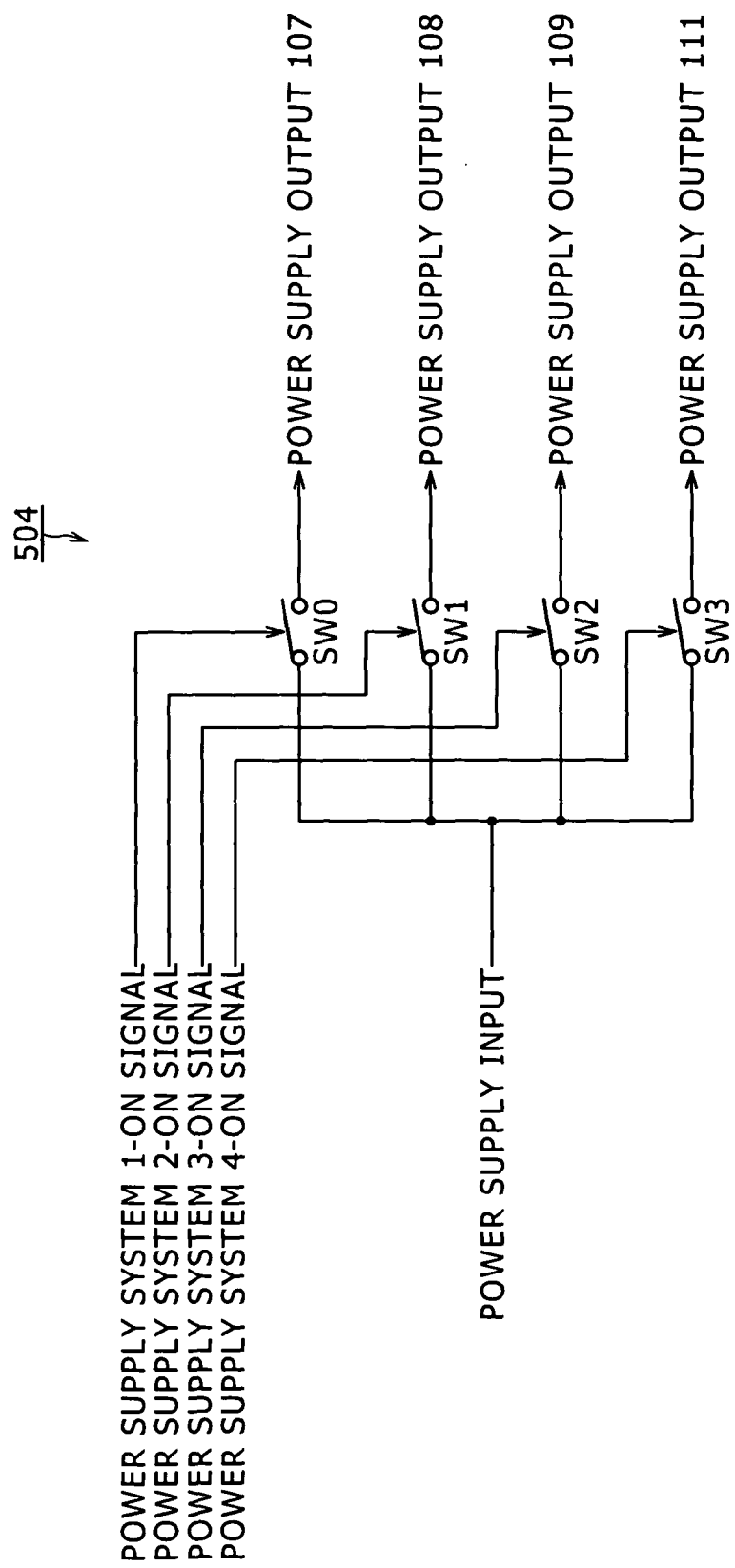
FIG. 11 is a schematic view showing an internal structure of a power supply switch.

FIG. 11 is a schematic view showing the structure of the power supply switch 504 representative of the power supply switches 504 through 506, the view being explanatory of how each power supply switch operates. As indicated in FIG. 11, the power supply switch 504 includes a total of four switches SW1 through SW4 electrically turned on in accordance with the power supply system 1-ON signal through power supply system 4-ON signal fed by the control section 146.

The switch SW1 is connected with the serial interface power supply section 501 and with a line for feeding the power supply 107 and is turned on in keeping with the power supply system 1-ON signal. The switch SW2 is connected with the serial interface power supply section 501 and with a line for feeding the power supply 108 and is turned on in accordance with the power supply system 2-ON signal. The switch SW3 is connected with the serial interface power supply section 501 and with a line for feeding the power supply 109 and is turned on according to the power supply system 3-ON signal. The switch SW4 is connected with the serial interface power supply section 501 and with a line for feeding the power supply 110 and is turned on depending on the power supply system 4-ON signal.

The power supply output section 149 of the above-described structure is fed with the power supply control signal 147 made up of the power supply system 1-ON signal through power supply system 4-ON signal. The signals prompt the power supply output section 149 to feed power to the components of the image processing device 15 as well as to the memory 23.

The clock output section 150 outputs the operation clock generated by a clock generator in the form of a plurality of clock signals. The clock signals can be turned on and off individually when output under a suitable control scheme. The clock output section 150 has two clock groups each composed of four clock signals turned on and off individually. One clock group is formed by operation clock signals 115 through 118 supplied to the memory interface 19 and image bus 126; the other clock group is made of operation clock signals 128 through 131 fed to the memory units 137 through 140, respectively.

By turning on and off the power supply systems and clock signals individually, the control section 146 changes at least one of three parameters in accordance with the number of the pixels represented by the pixel data input parallelly to the image input section 171. One of the three parameters is the number of the pixels represented by the pixel data which are processed parallelly by the arithmetic units 105a through 105d of the image input section 171; the second parameter is the data bus width over which the image bus 126 transmits data; and the third parameter is the data width over which the memory interface 19 gains access to the memory units 137 through 140. These arrangements help reduce the power consumption of the image processing device 15 and memory 23 in operation.

Illustratively, when the still image recording mode or HD moving image recording mode is in effect, the components of the image processing device 15 perform their processes in real time. In that case, all of the power supply systems 1 through 4 and clock systems 1 through 4 need to be turned on to activate the processors in the image processing device 15 and memory 23. By contrast, in the SD moving image recording mode or monitoring mode where the number of parallelly input pixels is limited, not all of the processors in the image processing device 15 and memory 23 need to be activated.

In order to save power consumed by the memory interface 19 or memory 23 in operation, the control section 146 may take the following concrete steps: in accordance with the imaging mode in effect, the control section 146 first establishes the data width over which the memory interface 19 accesses the memory 23.

With the data width established, the control section 146 supplies the clock output section 150 with the clock control signal 148 for turning on and off the clock systems 1 through 4. The clock control signal 148 is provided in such a manner as to change the number of drivers for driving the data lines of the memory interface 19 through which the operation clock signals 115 through 118 are supplied, i.e., to change the number of write data buffers 411 through 414 and read data buffers 421 through 424 to which to feed the operation clock signals 115 and 118, in accordance with the data width in effect.

The control section 146 then supplies the power supply output section 149 with the power supply control signal 147 for turning on and off the power supply systems 1 through 4. The power supply control signal 147 is provided in such a manner as to power only memory units 137 through 140 connected to the write data buffers 411 through 414 and read data buffers 421 through 424 to which the clock output section 150 feeds the operation clock signals selectively in accordance with the above-mentioned clock control signal 148.

The control section 146 further supplies the power supply output section 149 with the power supply control signal 147 in such a manner as to power only those of the write data buffers 411 through 414 and read data buffers 421 through 424 to which the clock output section 150 feeds the operation clock signals selectively in accordance with the above-mentioned clock control signal 148.

For example, suppose that the data width over which the memory interface 19 accesses the memory 23 is set for half of the maximum data width available. In that case, the control section 146 supplies the clock output section 150 with the clock control signal 148 for activating solely the clock systems 1 and 2. The clock control signal 148 causes the operation clock signals 115 and 116 to be fed to the read data buffers 421 and 422 and the operation clock signals 128 and 129 to be supplied to the memory units 137 and 138, respectively. The control section 146 further supplies the power supply output section 149 with the power supply control signal 147 for turning on solely the power supply systems 1 and 2. The power supply control signal 147 causes the write data buffers 411 and 412 and the read data buffers 421 and 422 to be fed with the power supplies 111 and 112, and the memory units 137 and 138 to be powered by the power supplies 141 and 142, respectively.

As described, when part of the serial input channels 103a through 103d are not used, the feeding of operation clock signals or the supply of power may be discontinued selectively to part of the components in the memory interface 19 or memory 23. This makes it possible to reduce the amount of power consumed by the memory interface 19 or memory 23 in operation.

In order to save power consumed by the image bus 126 in operation, the control section 146 may take the following steps: in accordance with the imaging mode in effect, the control section 146 first establishes the data width over which the image bus 126 transmits image data. That is, in proportion to the number of the pixels represented by the pixel data input parallelly to the image input section 171, the control section 146 causes pixel data to be transmitted through as many data lines of the image bus 126 as the number equal to an integer multiple of the number of channels in use.

More specifically, the control section 146 supplies the clock output section 150 with the clock control signal 148 for turning on and off selectively the clock systems 1 through 4 in accordance with the established data width. That is, the clock control signal 148 is provided in such a manner as to change the number of drivers for driving those data lines of the memory interface 19 to which the operation clock signals 115 through 118 are supplied, i.e., to change the number of multiplexers and demultiplexers to which to feed the operation clock signals 115 through 118.

The control section 146 further supplies the power supply output section 149 with the power supply control signal 147 for turning on and off the power supply systems 1 through 4. The power supply control signal 147 is provided in such a manner as to power only those of the multiplexers and demultiplexers to which the clock output section 150 supplies the operation clock signals in keeping with the above-mentioned clock control signal 148.

The control section 146 also supplies the power supply output section 149 with the power supply control signal 147 so as to power only those of the multiplexers and demultiplexers to which the clock output section 150 feeds the operation clock signals in accordance with the above-mentioned clock control signal 148.

Illustratively, suppose that the data width of the image bus 126 is set for half of the maximum data width of 32 bits (i.e., set for 16 bits). In that case, the control section 146 supplies the clock output section 150 with the clock control signal 148 for activating solely the clock systems 1 and 2. The clock control signal 148 is provided so as to feed the operation clock signals 115 and 116 to the multiplexers 201 through 216 out of the total of 32 multiplexers and to the demultiplexers 301 through 316 out of the total of 32 demultiplexers.

Furthermore, the control section 146 supplies the power supply output section 149 with the power supply control signal 147 for activating only the power supply systems 1 and 2. The power supply control signal 147 is provided so as to feed the power supplies 111 and 112 to the multiplexers 201 through 216 output of all 32 multiplexers and to the demultiplexers 301 through 316 out of all 32 demultiplexers.

As described, in keeping with a specific decrease in the number of serial input channels in use, the control section 146 may reduce the data width for the image bus 126 and discontinue selectively the supply of operation clock signals or the feeding of power to part of the circuits making up the image bus 126. This helps reduce the amount of power consumed by the image bus 126.

The control section 146 can reduce the amount of power consumed by the arithmetic units 105a through 105d in the image input section 171, by taking the following steps: in accordance with the number of channels through which to input pixel data parallelly to the image input section 171, the control section 146 changes the number of the arithmetic units 105a through 105d being used.

More specifically, the control section 146 supplies the clock output section 150 with the clock control signal 148 for selectively turning on and off the clock systems 1 through 4 so as to change the number of the arithmetic units 105a through 105d being used.

The control section 146 further supplies the power supply output section 149 with the power supply control signal 147 for selectively turning on and off the power supply systems 1 through 4. The power supply control signal 147 is provided so as to feed power only to those of the arithmetic units 105a through 105d to which the clock output section 150 supplies the operation clock signals in accordance with the above-mentioned clock control signal 148.

Illustratively, suppose that pixel data is sent only to the serial input channels 103a and 103b. In that case, the control section 146 supplies the clock output section 150 with the clock control signal 148 for activating solely the clock systems 1 and 2, thereby feeding the operation clock signals 115 and 116 to only the arithmetic units 105a and 105b respectively.

The control section 146 further supplies the power supply output section 149 with the power supply control signal 147 for activating solely the power supply systems 1 and 2. The power supply control signal 147 is provided to feed the power supplies 111 and 112 to only the arithmetic units 105a and 105b respectively.

In the manner described above, when the number of serial input channels in use is reduced, the control section 146 decreases the number of arithmetic units 105a through 105d set for parallel processing and discontinues the supply of operation clock signals or the feeding of power to the unused arithmetic units. This makes it possible to reduce the amount of power consumed by the arithmetic units 105a through 105d.

As described above, the control section 146 can easily determine the number of memory units 23 to be used, the data width of the memory interface 19, the data width of the image bus 126, and the number of arithmetic units 105a through 105d set for parallel processing, in accordance with the number of serial input channels in use. These arrangements make it possible easily to reduce the amount of power consumed by the image processing device 15 and memory 23.

Figure 12:
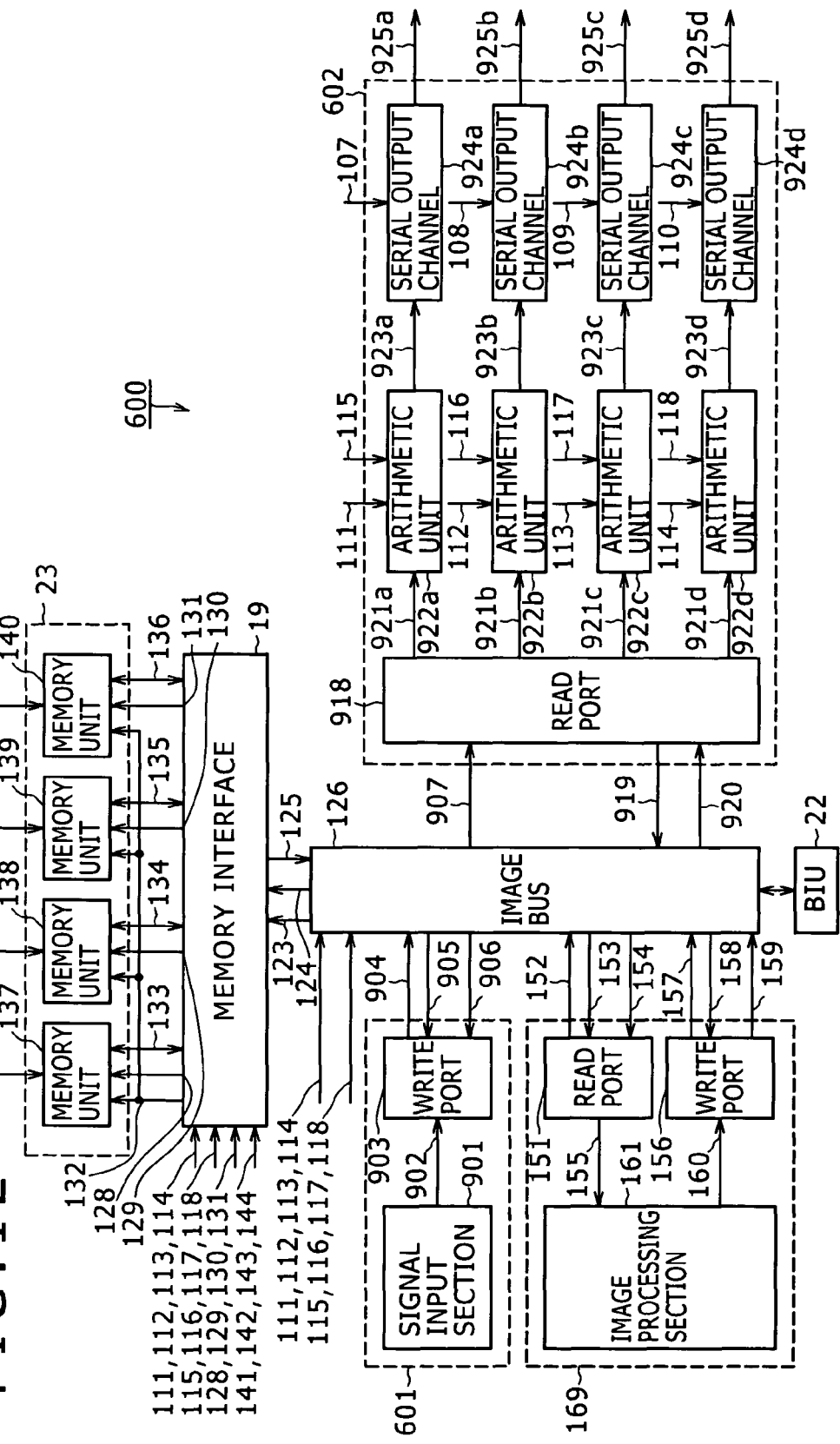
FIG. 12 is a schematic view showing a circuit structure of an image processing device practiced as a second embodiment of the present invention.

A variation of the image processing device 15 mounted on the circuit board will now be described as the second embodiment of the present invention. FIG. 12 schematically shows an image processing device 600 practiced as the second embodiment of the invention.

The image processing device 600, as shown in FIG. 12, is structured to have the image bus 126 connected with an image input section 601, the memory interface 19, the image processing section 169, an image output section 602, and the BIU 22. The memory interface 19, the memory 23 connected to the memory interface 19, and the image processing section 169 have the same structures as those of their counterparts in the image processing device 15 and BIU 22 constituting the above-described first embodiment. These components are thus designated by like reference numerals and their descriptions are omitted hereunder where redundant. The component processors of the image processing device 600 and memory 23 making up the second embodiment operate when powered by the power supply output section 149 and supplied with operation clock signals from the clock output section 150 in the control section 146.

The image input section 601 includes a signal input section 901 and a write port 903. In the image input section 601, the signal input section 901 admits pixel data from the preprocessor 11 and forwards the input pixel data 902 to the write port 903. Given the pixel data 902, the write port 903 writes the supplied data to the image bus 126. When a predetermined number of pixel data 902 are supplied to the write port 903, the write port 903 sends a write request signal 904 to the image bus 126 and waits for a write enable signal 905 to be returned from the image bus 126. When the write enable signal 905 is subsequently received, the write port 903 outputs a predetermined number of write data 906 onto the image bus 126.

The image output section 602 includes a read port 918, a total of four arithmetic units 922a through 922d, and a total of four serial output channels 924a through 924d. The read port 918 sends a read request signal 919 to the image bus 126. Upon receipt of a read enable signal 920 from the image bus 126 in return, the read port 918 reads a maximum of "n" read data (n is a positive integer), e.g., a total of four pixel data. The parallelly read pixel data 921a, 921b, 921c and 921d are forwarded to the arithmetic units 922a through 922d, respectively.

The arithmetic units 922a through 922d arithmetically process the read pixel data 921a through 921d coming from the read port 918. The pixel data 923a through 923d thus processed is sent to the serial output channels 924a through 924d respectively.

The arithmetic units 922a through 922d operate when powered by the power supplies 111, 112, 113 and 114 and fed with the operation clock signals 115, 116, 117 and 118, respectively. The power supplies 111 through 114 and the operation clock signals 115 through 118 are turned on and off individually by the control section 146.

As many arithmetic units 922a through 922d may be provided as the number of serial output channels 924a through 924d, as shown in FIG. 12. Alternatively, the number of arithmetic units 922a through 922d may be made smaller than that of serial output channels 924a through 924d so that the arithmetically processed pixel data 923 may be sent sequentially to the serial output channels 924a through 924d.

The serial output channels 924a through 924d are fed with the pixel data 923a through 923d in an eight-bit parallel format. The serial output channels 924a through 924d convert the parallelly admitted pixel data into pixel data 925a through 925d in an eight-bit serial format for output to the outside of the image processing device 600.

The serial output channels 924a through 924d operate when fed with the power supplies 107, 108, 109 and 110 which are turned on and off individually by the control section 146.

In the image processing device 600 of the above-described structure practiced as the second embodiment of the invention, the control section 146 changes at least one of three parameters in accordance with the number of the pixels represented by the pixel data to be output parallelly to the outside through the serial output channels 924a through 924d in the image output section 602. One of the three parameters is the number of the pixels represented by the pixel data processed parallelly and arithmetically by the arithmetic units 922a through 922d of the image input section 601. The second parameter is the data width over which the image bus 126 transmits data. The third parameter is the data width over which the memory interface 19 accesses the memory units 137 through 140. In this manner, the second embodiment reduces the amount of power consumed by the image processing device 600 and memory 23.

In order to have the memory interface 19 or memory 23 consume less power, the control section 146 may take the following steps: in keeping with the imaging mode in effect, the control section 146 first establishes the data width over which the memory interface 19 accesses the memory 23.

The control section 146 supplies the clock output section 150 with the clock control signal 148 for turning on and off selectively the clock systems 1 through 4 in accordance with the established data width. That is, the clock control signal 148 is provided in such a manner as to change the number of drivers for driving those data lines of the memory interface 19 to which the operation clock signals 115 through 118 are supplied, i.e., to change the number of write data buffers 411 through 414 and read data buffers 421 through 424 to which to feed the operation clock signals 115 through 118.

The control section 146 further supplies the power supply output section 149 with the power supply control signal 147 for turning on and off the power supply systems 1 through 4. The power supply control signal 147 is provided in such a manner as to power only memory units 137 through 140 connected to the write data buffers 411 through 414 and read data buffers 421 through 424 to which the clock output section 150 supplies the operation clock signals in keeping with the above-mentioned clock control signal 148.

The control section 146 also supplies the power supply output section 149 with the power supply control signal 147 so as to power only those of the write data buffers 411 through 414 and read data buffers 421 through 424 to which the clock output section 150 feeds the operation clock signals in accordance with the above-mentioned clock control signal 148.

Illustratively, suppose that the data width over which the memory interface 19 accesses the memory 23 is set for half of the maximum data width available. In that case, the control section 146 supplies the clock output section 150 with the clock control signal 148 for activating solely the clock systems 1 and 2 so as to feed the operation clock signals 115 and 116 to the write data buffers 411 and 412 and read data buffers 421 and 422 and the operation clock signals 128 and 129 to the memory units 137 and 138. The control section 146 further supplies the power supply output section 149 with the power supply control signal 147 for activating solely the power supply systems 1 and 2 so as to feed the power supplies 111 and 112 to the write data buffers 411 and 412 and read data buffers 421 and 422 and the power supplies 141 and 142 to the memory units 137 and 138.

As described, when the number of serial output channels 924a through 924d in use is reduced, the control section 146 may discontinue the supply of operation clock signals or the feeding of power to part of the components making up the memory interface 19 or memory 23. This helps reduce the amount of power consumed by the memory interface 19 or memory 23.

The control unit 146 may reduce the amount of power consumed by the image bus 126 by taking the following steps: in accordance with the imaging mode in effect, the control section 146 first establishes the data width over which the image bus 126 transmits image data. That is, in proportion to the number of the pixels represented by the pixel data input parallelly to the image input section 171, the control section 146 causes pixel data to be transmitted through as many data lines of the image bus 126 as the number equal to an integer multiple of the number of channels in use.

More specifically, the control section 146 supplies the clock output section 150 with the clock control signal 148 for turning on and off selectively the clock systems 1 through 4 in accordance with the established data width. That is, the clock control signal 148 is provided in such a manner as to change the number of drivers for driving those data lines of the memory interface 19 to which the operation clock signals 115 through 118 are supplied, i.e., to change the number of multiplexers and demultiplexers to which to feed the operation clock signals 115 through 118.

The control section 146 further supplies the power supply output section 149 with the power supply control signal 147 for turning on and off the power supply systems 1 through 4. The power supply control signal 147 is provided in such a manner as to power only those of the multiplexers and demultiplexers to which the clock output section 150 supplies the operation clock signals in keeping with the above-mentioned clock control signal 148.

The control section 146 also supplies the power supply output section 149 with the power supply control signal 147 so as to power only those of the multiplexers and demultiplexers to which the clock output section 150 feeds the operation clock signals in accordance with the above-mentioned clock control signal 148.

Illustratively, suppose that the data width of the image bus 126 is set for half of the maximum data width of 32 bits (i.e., set for 16 bits). In that case, the control section 146 supplies the clock output section 150 with the clock control signal 148 for activating solely the clock systems 1 and 2. The clock control signal 148 is provided so as to feed the operation clock signals 115 and 116 to the multiplexers 201 through 216 out of the total of 32 multiplexers and to the demultiplexers 301 through 316 out of the total of 32 demultiplexers.

Furthermore, the control section 146 supplies the power supply output section 149 with the power supply control signal 147 for activating only the power supply systems 1 and 2. The power supply control signal 147 is provided so as to feed the power supplies 111 and 112 to the multiplexers 201 through 216 output of all 32 multiplexers and to the demultiplexers 301 through 316 out of all 32 demultiplexers.

As described, in keeping with a given decrease in the number of serial output channels 924a through 924d in use, the control section 146 may reduce the data width for the image bus 126 and discontinue selectively the supply of operation clock signals or the feeding of power to part of the circuits making up the image bus 126. This helps reduce the amount of power consumed by the image bus 126.

The control section 146 may reduce the amount of power consumed by the arithmetic units 105a through 105d in the image input section 171, by taking the following steps: in accordance with the number of channels through which the image output section 602 outputs pixel data parallelly, the control section 146 changes the number of the arithmetic units 922a through 922d being used.

More specifically, the control section 146 supplies the clock output section 150 with the clock control signal 148 for selectively turning on and off the clock systems 1 through 4 so as to change the number of the arithmetic units 922a through 922d being used.

The control section 146 further supplies the power supply output section 149 with the power supply control signal 147 for selectively turning on and off the power supply systems 1 through 4. The power supply control signal 147 is provided so as to feed power only to those of the arithmetic units 922a through 922d to which the clock output section 150 supplies the operation clock signals in accordance with the above-mentioned clock control signal 148.

Illustratively, suppose that pixel data is sent only to the serial output channels 924a and 924b. In that case, the control section 146 supplies the clock output section 150 with the clock control signal 148 for activating solely the clock systems 1 and 2, thereby feeding the operation clock signals 115 and 116 to only the arithmetic units 922a and 922b respectively.

The control section 146 further supplies the power supply output section 149 with the power supply control signal 147 for activating solely the power supply systems 1 and 2. The power supply control signal 147 is provided to feed the power supplies 111 and 112 to only the arithmetic units 922a and 922b respectively.

In the manner described above, when the number of serial output channels in use is reduced, the control section 146 decreases the number of arithmetic units 922a through 922d set for parallel processing and discontinues the supply of operation clock signals or the feeding of power to the unused arithmetic units. This makes it possible to reduce the amount of power consumed by the arithmetic units 922a through 922d.

As described above, the control section 146 can easily determine the number of memory units 23 to be used, the data width of the memory interface 19, the data width of the image bus 126, and the number of arithmetic units 922a through 922d set for parallel processing, in accordance with the number of serial output channels in use. These arrangements make it possible easily to reduce the amount of power consumed by the image processing device 15 and memory 23.

It should be understood by those skilled in the art that various modifications, combinations, sub-combinations and alterations may occur depending on design requirements and other factor in so far as they are within the scope of the appended claims or the equivalents thereof.

What is claimed is:

1. An image processing apparatus comprising:

an input section configured to have a total of m channels with input means for admitting pixel data output by imaging means on a pixel-by-pixel basis and in parallel, m being a positive integer, and arithmetic means arithmetically processing said pixel data input to said input means;

a bus configured to be connected to said input section, said bus being further configured to transmit said pixel data processed arithmetically by said arithmetic means;

a memory interface configured to be connected to said bus, said memory interface being further configured to write to a memory said pixel data arithmetically processed by said arithmetic means, said memory interface being further configured to control access to said memory in accordance with an access request from a processing unit connected to said bus;

an output section configured to be connected to said memory interface through said bus, said output section being further configured to request said memory interface for access to said memory in order to read the pixel data therefrom for output to the outside; and a control section configured to change at least one of three parameters including a parallelly processed pixel count, a data bus width, and a memory interface data width in accordance with the number of the pixels represented by the pixel data which are acquired by said imaging means and input parallelly to said input section, said parallelly processed pixel count being the number of the pixels represented by the pixel data which are processed parallelly by said arithmetic means, said data bus width being one over which said bus transmits data, said memory interface data width being one over which said memory interface gains access to said memory.

2. The image processing apparatus according to claim 1, wherein said control section changes all of said parallelly processed pixel count, said data bus width, and said memory interface data width in accordance with the number of the pixels represented by the pixel data which are acquired by said imaging means and input parallelly to said input section.

3. The image processing apparatus according to claim 2, wherein, in accordance with an imaging mode, said imaging means changes the number of the pixels represented by the pixel data which are output on a pixel-by-pixel basis and in parallel.

4. The image processing apparatus according to claim 3, wherein said memory interface is connected to a total of w memory units constituting said memory through a total of w data lines, w being a positive integer, each of said memory units having a data width equal to 1/w of said memory interface data width;

said control section includes clock output means for outputting an operation clock signal with which to operate drivers for driving said data lines of said memory interface; and in accordance with said memory interface data width, said clock output means changes the number of the drivers for driving the data lines of said memory interface through which to supply said operation clock signal.

5. The image processing apparatus according to claim 4, wherein said control section includes power supply output means for supplying power to said data lines of said memory interface; and said power supply output means supplies power only to the drivers to which said clock output means supplies said operation clock signal, the signal-supplied drivers driving the data lines of said memory interface.

6. The image processing apparatus according to claim 4, wherein said control section includes power supply output means for supplying power to said memory units; and said power supply output means supplies power only to the memory units connected to those data lines of said memory interface which are driven by said clock output means supplying said operation clock signal.

7. The image processing apparatus according to claim 3, wherein said bus includes a plurality of data lines which are accessed by processing units connected to said bus and which transmit said pixel data; and in proportion to the number of the pixels represented by the pixel data which are acquired by said imaging means and input parallelly to said input section, said control section transmits said pixel data through part of said data lines owned by said bus, said part of said data lines being as many as an integer multiple of the number of said channels.

8. The image processing apparatus according to claim 7, wherein said bus includes multiplexers configured to select the data lines connected to one of the processing units connected to said data lines of said bus, in order to transmit said pixel data to said memory interface through the selected data lines;

said control section includes clock output means for outputting an operation clock signal with which to operate said multiplexers owned by said bus; and said clock output means supplies said operation clock signal only to the multiplexers connected to the data lines through which to transmit said pixel data in accordance with said bus data width.

9. The image processing apparatus according to claim 8, wherein said control section includes power supply output means for supplying power to said multiplexers owned by said bus; and said power supply output means supplies power only to the multiplexers to which said clock output means supplies said operation clock signal.

10. The image processing apparatus according to claim 7, wherein said bus includes demultiplexers configured to select the data lines connected to one of the processing units connected to said data lines of said bus, in order to transmit to the selected data lines the pixel data read from said memory through said memory interface;

said control section includes clock output means for outputting an operation clock signal with which to operate said demultiplexers owned by said bus; and said clock output means supplies said operation clock signal only to the demultiplexers connected to the data lines through which to transmit said pixel data in accordance with said bus data width.

11. The image processing apparatus according to claim 10, wherein said control section includes power supply output means for supplying power to said demultiplexers owned by said bus; and said power supply output means supplies power only to the demultiplexers to which said clock output means supplies said operation clock signal.

12. The image processing apparatus according to claim 3, wherein said arithmetic means is formed by arithmetic units which correspond to a total of m channels and which process arithmetically the pixel data input to said input means; and said control section changes the number of the arithmetic units used by said arithmetic means in accordance with the number of channels for the pixel data which are acquired by said imaging means and input parallelly to said input section.

13. The image processing apparatus according to claim 12, wherein said control section includes clock output means for outputting an operation clock signal with which to operate said arithmetic units of said arithmetic means; and said clock output means changes the number of the arithmetic units to which to supply said operation clock signal, in accordance with the number of the pixels represented by the pixel data processed by said arithmetic means arithmetically and parallelly.

14. The image processing apparatus according to claim 12, wherein said control section includes power supply output means for supplying power to said arithmetic units of said arithmetic means; and said power supply output means supplies power only to the arithmetic units to which said clock output means supplies said operation clock signal.

15. A method for controlling an image processing apparatus which includes:

an input section configured to have a total of m channels with input means for admitting pixel data output by imaging means on a pixel-by-pixel basis and in parallel, m being a positive integer, and arithmetic means arithmetically processing said pixel data input to said input means;

a bus configured to be connected to said input section, said bus being further configured to transmit said pixel data processed arithmetically by said arithmetic means;

a memory interface configured to be connected to said bus, said memory interface being further configured to write to a memory said pixel data arithmetically processed by said arithmetic means, said memory interface being further configured to control access to said memory in accordance with an access request from a processing unit connected to said bus; and an output section configured to be connected to said memory interface through said bus, said output section being further configured to request said memory interface for access to said memory in order to read the pixel data therefrom for output to the outside;

said method comprising the step of changing at least one of three parameters including a parallelly processed pixel count, a data bus width, and a memory interface data width in accordance with the number of the pixels represented by the pixel data which are acquired by said imaging means and input parallelly to said input section, said parallelly processed pixel count being the number of the pixels represented by the pixel data which are processed parallelly by said arithmetic means, said data bus width being one over which said bus transmits data, said memory interface data width being one over which said memory interface gains access to said memory.

16. An image processing apparatus comprising:

an input section configured to admit pixel data acquired by imaging means;

a bus configured to be connected to said input section, said bus being further configured to transmit said pixel data input to said input section;

a memory interface configured to be connected to said bus, said memory interface being further configured to write to a memory said pixel data which are transmitted over said bus and input to said input section, said memory interface being further configured to control access to said memory in accordance with an access request from a processing unit connected to said bus;

an output section configured to be connected to said memory interface through said bus, said output section being further configured to include read means, arithmetic means and output means, said read means reading on a pixel-by-pixel basis and in parallel over a maximum of n channels the pixel data which represent a maximum of n pixels and which are written to said memory following an access request to said memory interface, n being a positive integer, said arithmetic means arithmetically processing on a pixel-by-pixel basis the pixel data read by said read means, said output means outputting to the outside the pixel data processed arithmetically by said arithmetic means; and a control section configured to change at least one of three parameters including a parallelly processed pixel count, a data bus width, and a memory interface data width in accordance with the number of the pixels represented by the pixel data output parallelly to the outside by said output means of said output section, said parallelly processed pixel count being the number of the pixels represented by the pixel data which are processed parallelly by said arithmetic means, said data bus width being one over which said bus transmits data, said memory interface data width being one over which said memory interface gains access to said memory.

17. A method for controlling an image processing apparatus which includes:

an input section configured to admit pixel data acquired by imaging means;

a bus configured to be connected to said input section, said bus being further configured to transmit said pixel data input to said input section;

a memory interface configured to be connected to said bus, said memory interface being further configured to write to a memory said pixel data which are transmitted over said bus and input to said input section, said memory interface being further configured to control access to said memory in accordance with an access request from a processing unit connected to said bus; and an output section configured to be connected to said memory interface through said bus, said output section being further configured to include read means, arithmetic means, and output means, said read means reading on a pixel-by-pixel basis and in parallel over a maximum of n channels the pixel data which represent a maximum of n pixels and which are written to said memory following an access request to said memory interface, n being a positive integer, said arithmetic means arithmetically processing on a pixel-by-pixel basis the pixel data read by said read means, said output means outputting to the outside the pixel data processed arithmetically by said arithmetic means;

said method comprising the step of changing at least one of three parameters including a parallelly processed pixel count, a data bus width, and a memory interface data width in accordance with the number of the pixels represented by the pixel data output parallelly to the outside by said output means of said output section, said parallelly processed pixel count being the number of the pixels represented by the pixel data which are processed parallelly by said arithmetic means, said data bus width being one over which said bus transmits data, said memory interface data width being one over which said memory interface gains access to said memory.

* * * * *